United States Patent
Nishimura

(10) Patent No.: US 8,958,007 B2
(45) Date of Patent: Feb. 17, 2015

(54) ZOOM LENS AND IMAGE PICKUP APPARATUS HAVING THE SAME

(71) Applicant: Canon Kabushiki Kaisha, Tokyo (JP)

(72) Inventor: Takeshi Nishimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/942,341

(22) Filed: Jul. 15, 2013

(65) Prior Publication Data

US 2014/0022442 A1 Jan. 23, 2014

(30) Foreign Application Priority Data

Jul. 18, 2012 (JP) .................................. 2012-159442

(51) Int. Cl.

| G03B 13/00 | (2006.01) |
| G02B 15/14 | (2006.01) |
| H04N 5/232 | (2006.01) |
| G02B 15/177 | (2006.01) |
| G02B 27/64 | (2006.01) |

(52) U.S. Cl.
CPC ............ *G02B 15/14* (2013.01); *H04N 5/23212* (2013.01); *G02B 15/177* (2013.01); *G02B 27/646* (2013.01)
USPC .......................................................... 348/345

(58) Field of Classification Search
USPC ............................ 348/345–349; 359/696, 698
See application file for complete search history.

(56) References Cited

U.S. PATENT DOCUMENTS

| 8,189,074 B2 | 5/2012 | Miyazaki et al. |
| 2007/0201142 A1* | 8/2007 | Narikawa et al. ............. 359/680 |
| 2008/0198475 A1* | 8/2008 | Arimoto et al. ............... 359/687 |
| 2010/0091170 A1 | 4/2010 | Miyazaki et al. |
| 2010/0238561 A1* | 9/2010 | Nakagawa et al. .......... 359/683 |
| 2011/0109978 A1* | 5/2011 | Yamada et al. ............... 359/684 |
| 2012/0307367 A1* | 12/2012 | Bito et al. ..................... 359/557 |

FOREIGN PATENT DOCUMENTS

| JP | 2001343584 A | 12/2001 |
| JP | 2003131130 A | 5/2003 |

* cited by examiner

*Primary Examiner* — Mekonnen Dagnew
(74) *Attorney, Agent, or Firm* — Canon USA Inc. IP Division

(57) ABSTRACT

A zoom lens includes a first lens unit having negative refractive power, a second lens unit having positive refractive power, a third lens unit having negative refractive power, and a fourth lens unit having positive refractive power, in order from an object side to an image side, each lens unit moving during zooming, and the third lens unit moving toward the object side during focusing from an infinitely-distant object to a nearby object. A focal length f3 of the third lens unit, a composite focal length f12t of the first lens unit and the second lens unit at a telephoto end, a focal length fw of the entire system at a wide-angle end, and a focal length ft of the entire system at the telephoto end are appropriately set.

14 Claims, 19 Drawing Sheets

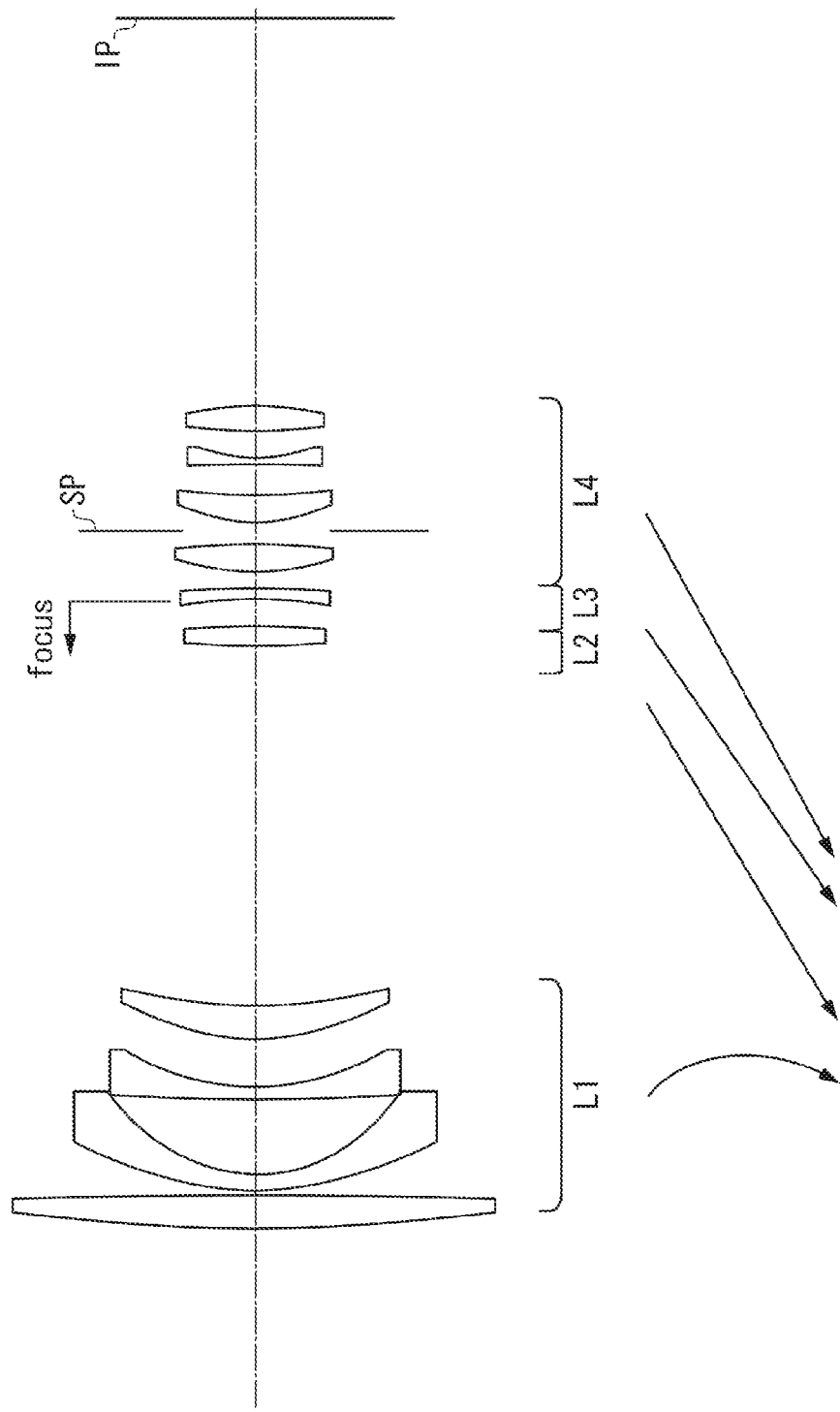

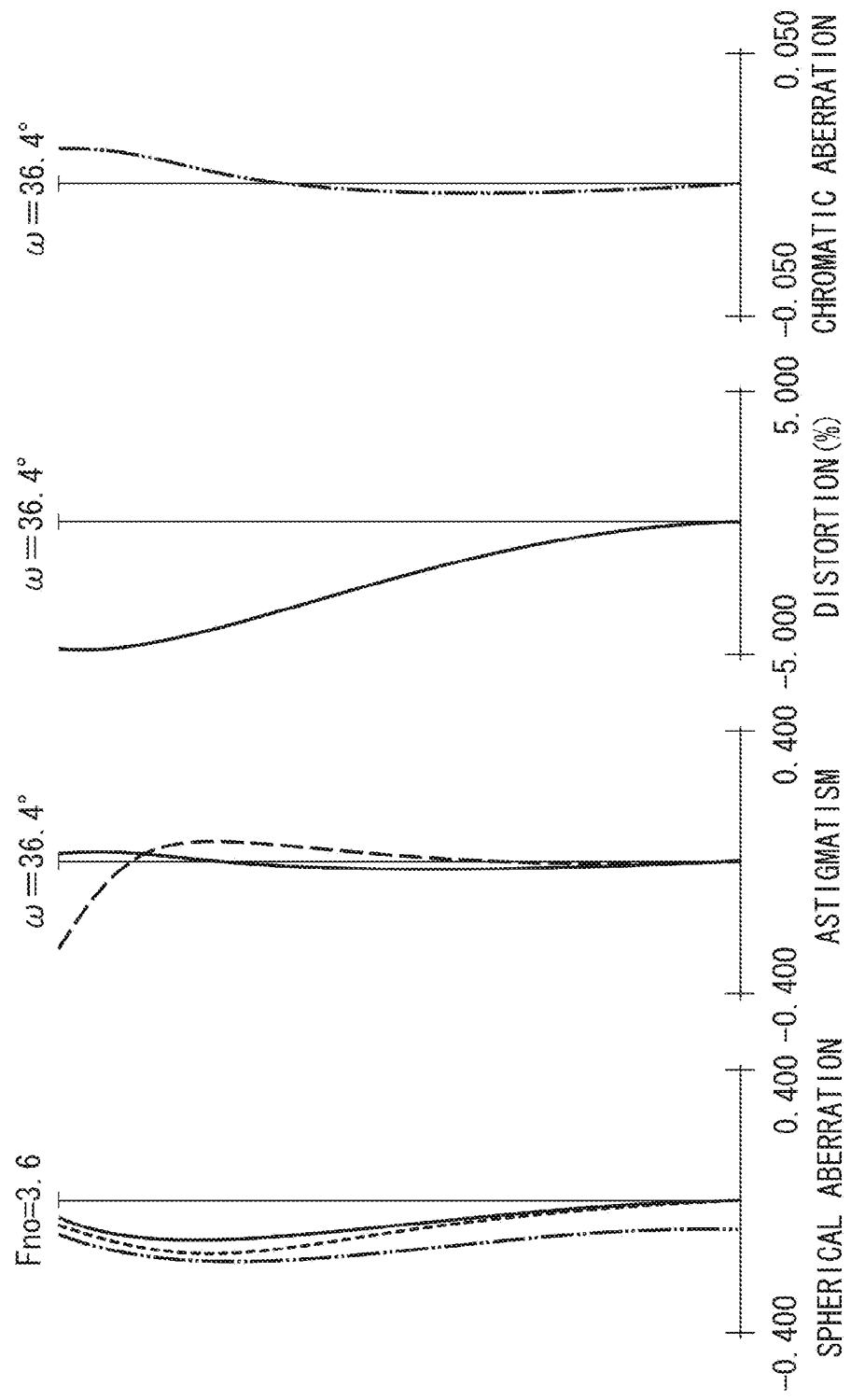

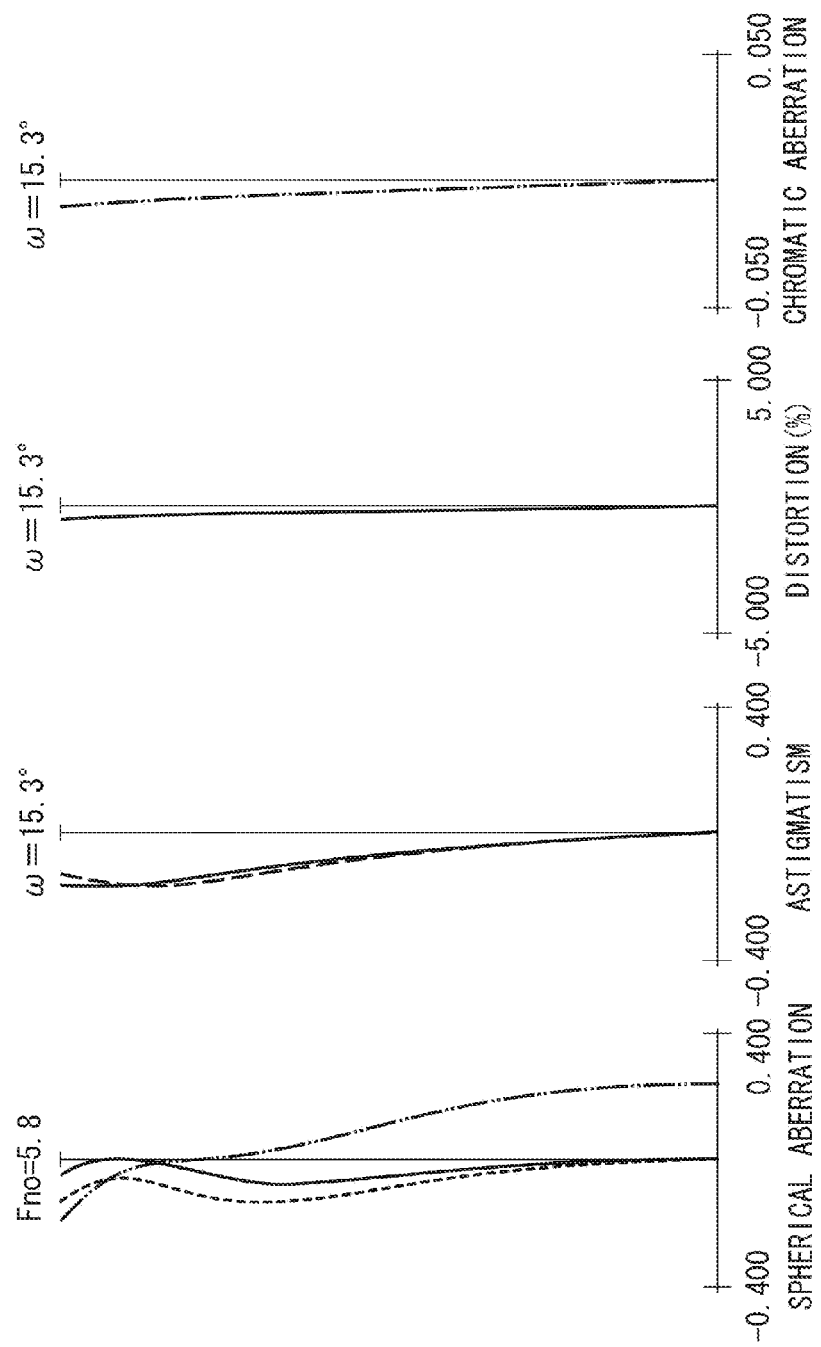

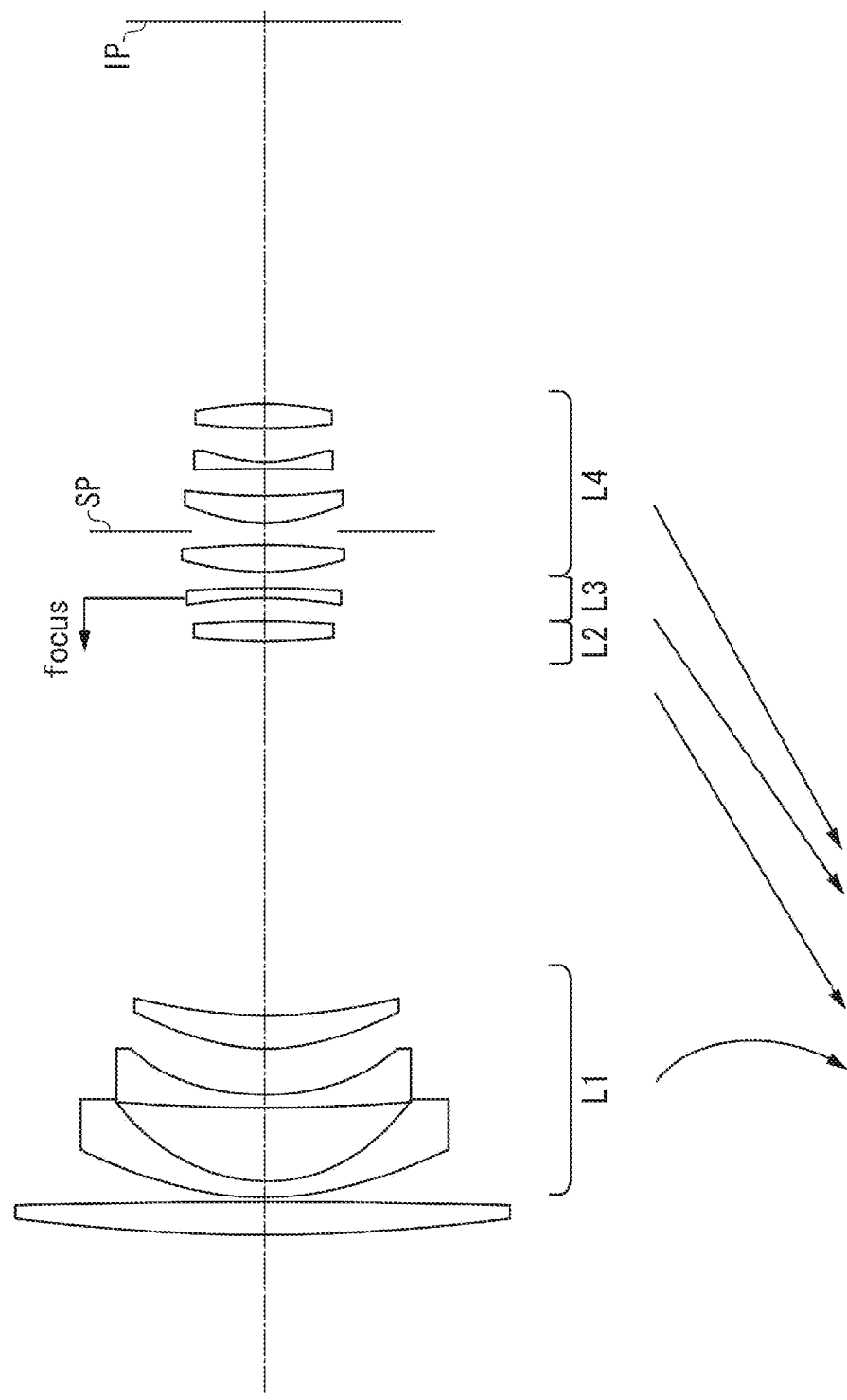

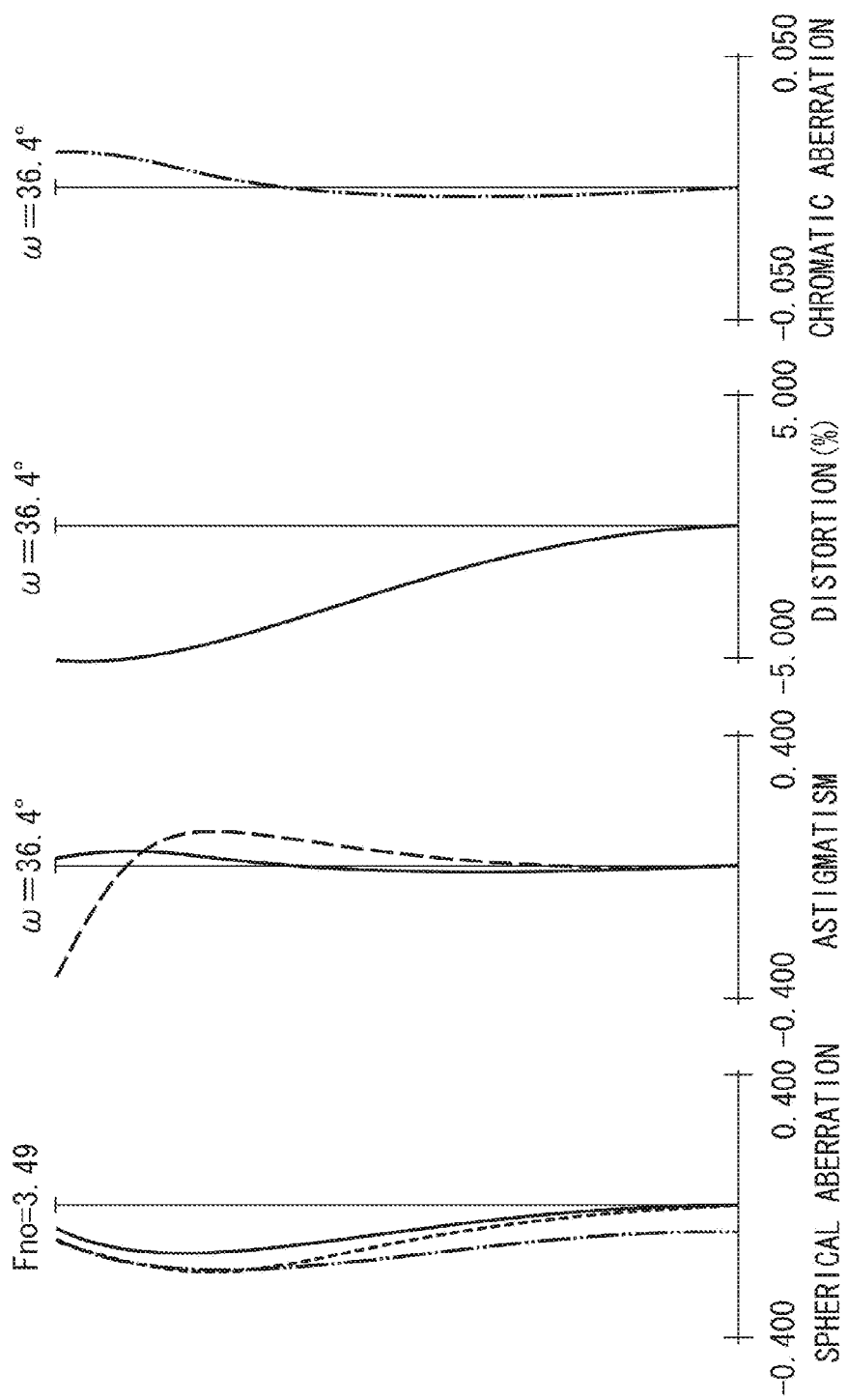

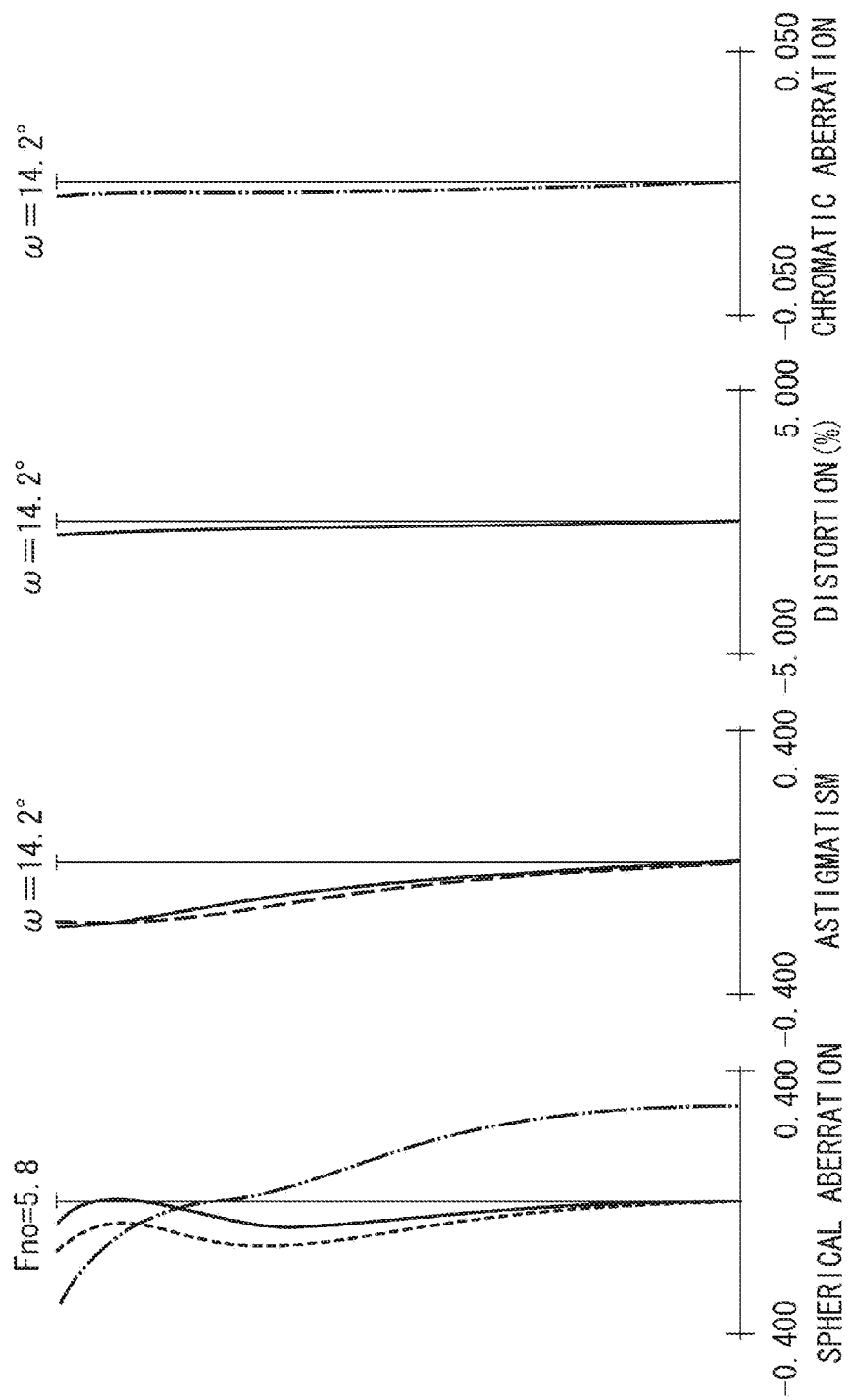

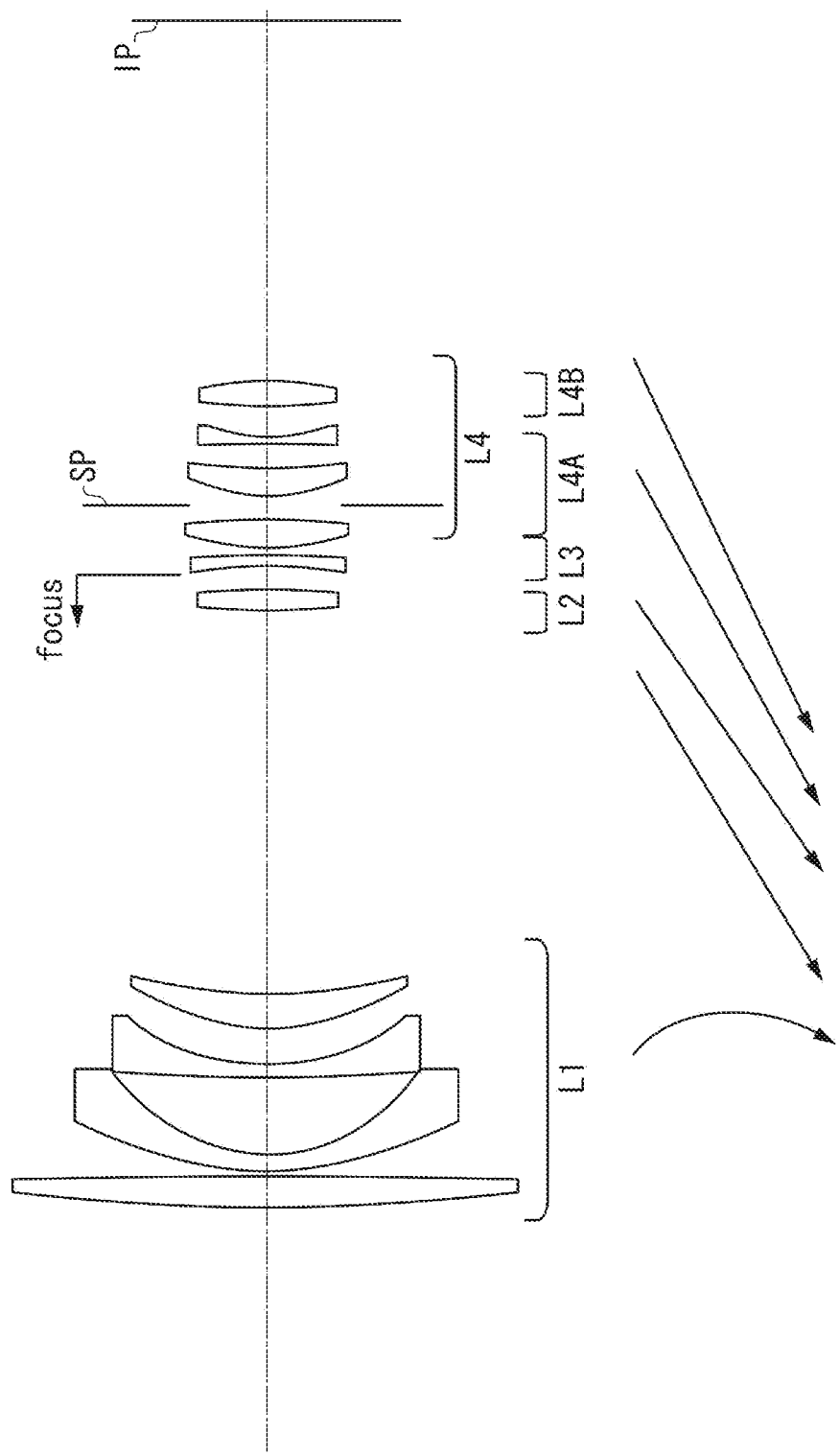

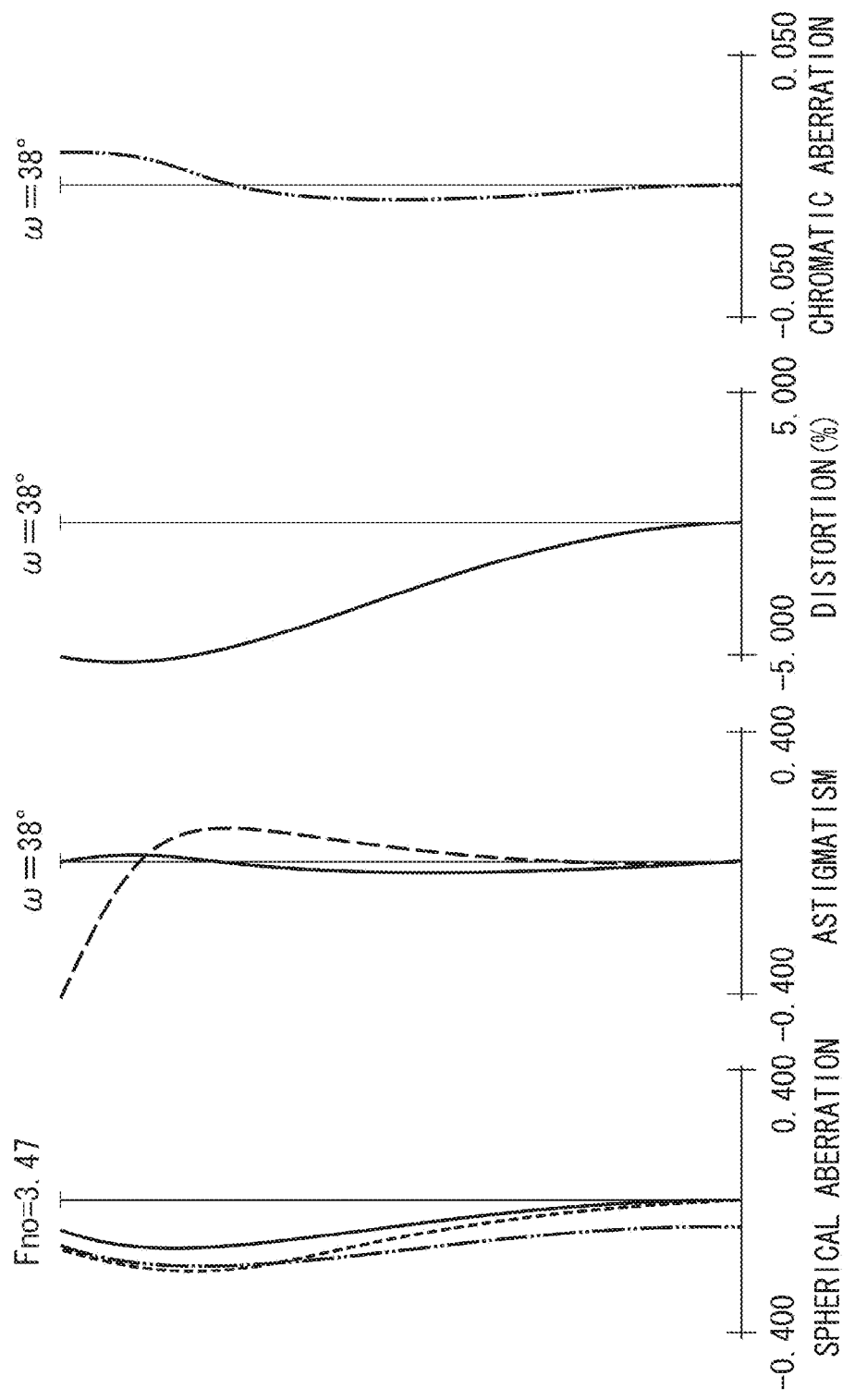

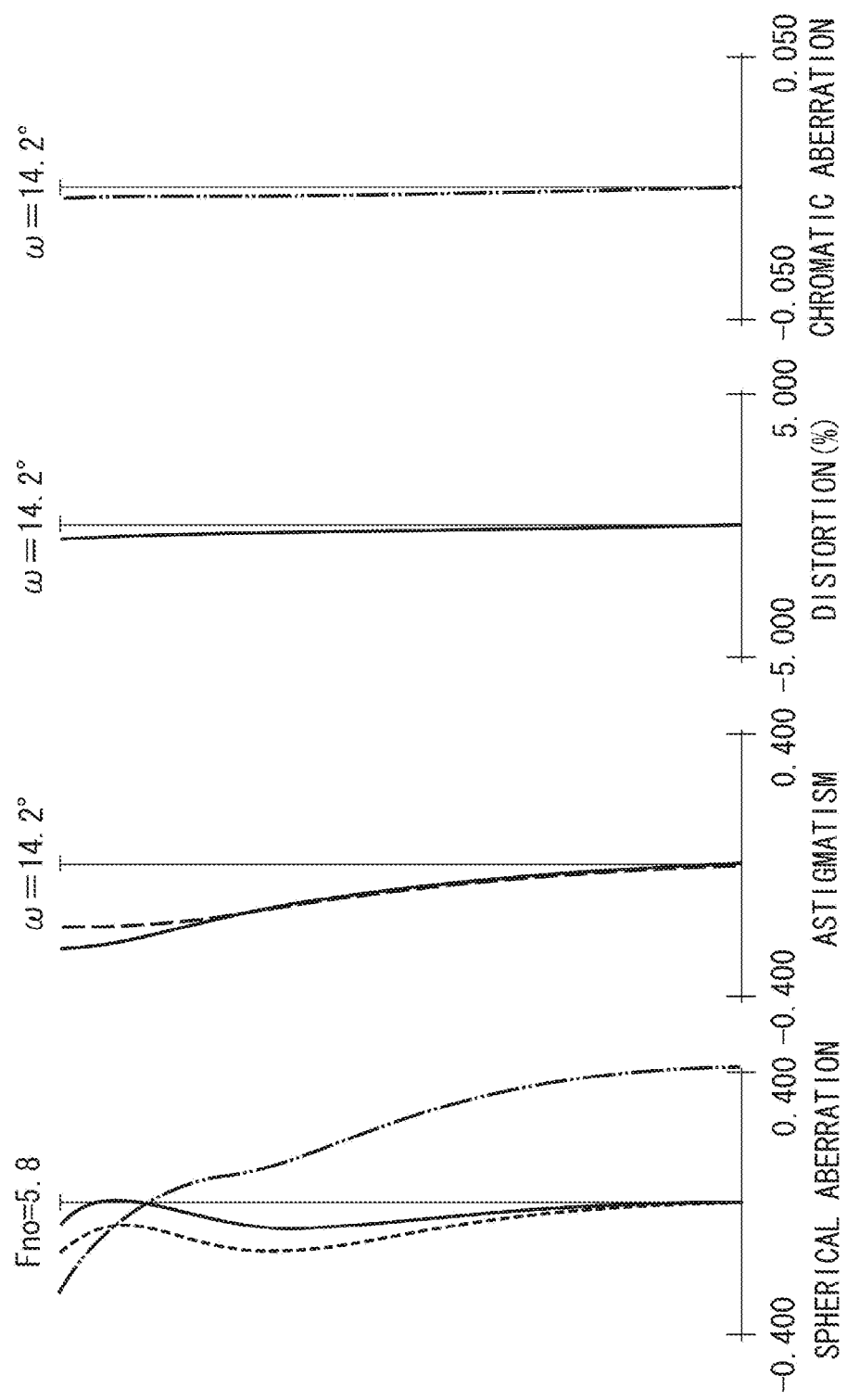

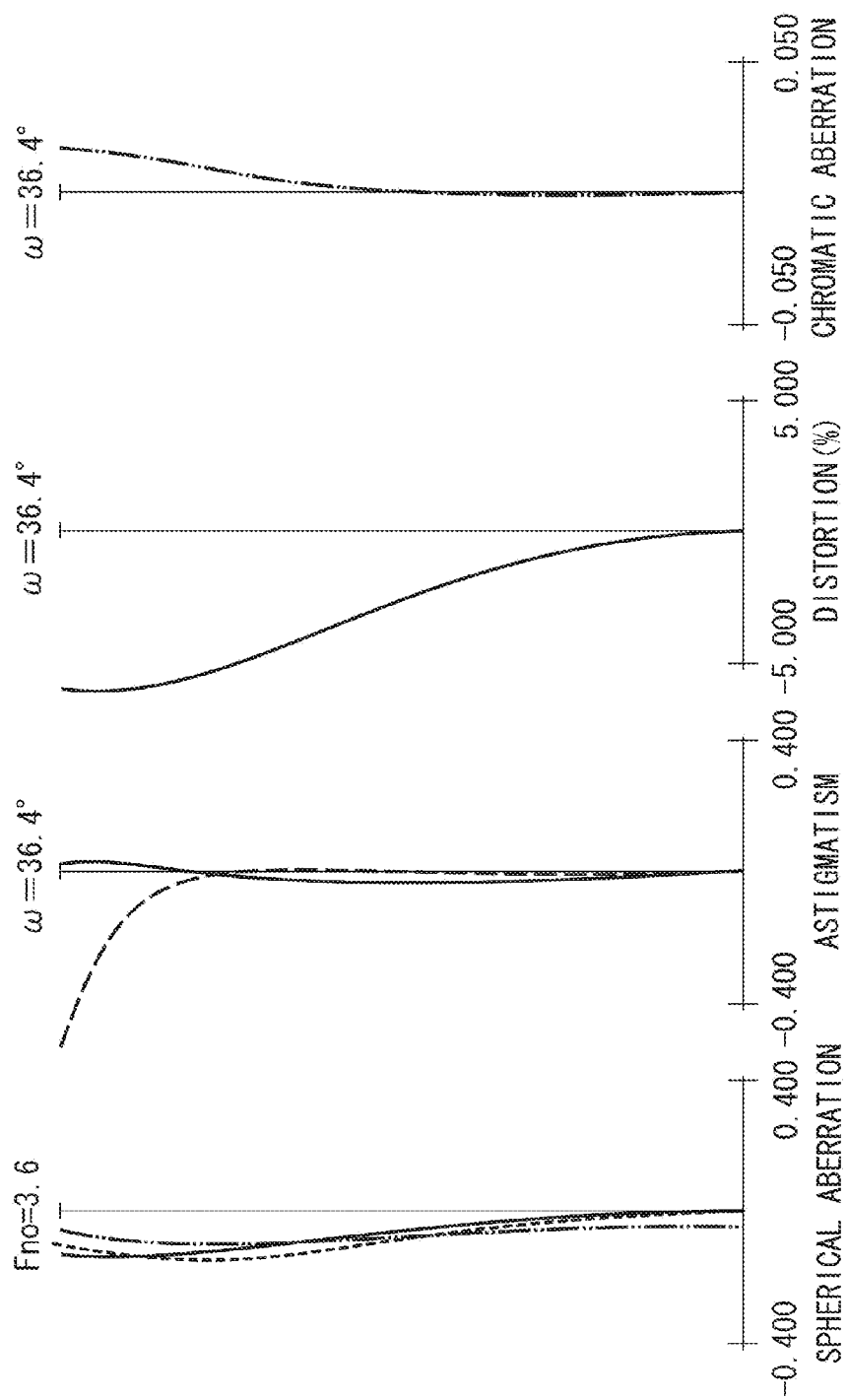

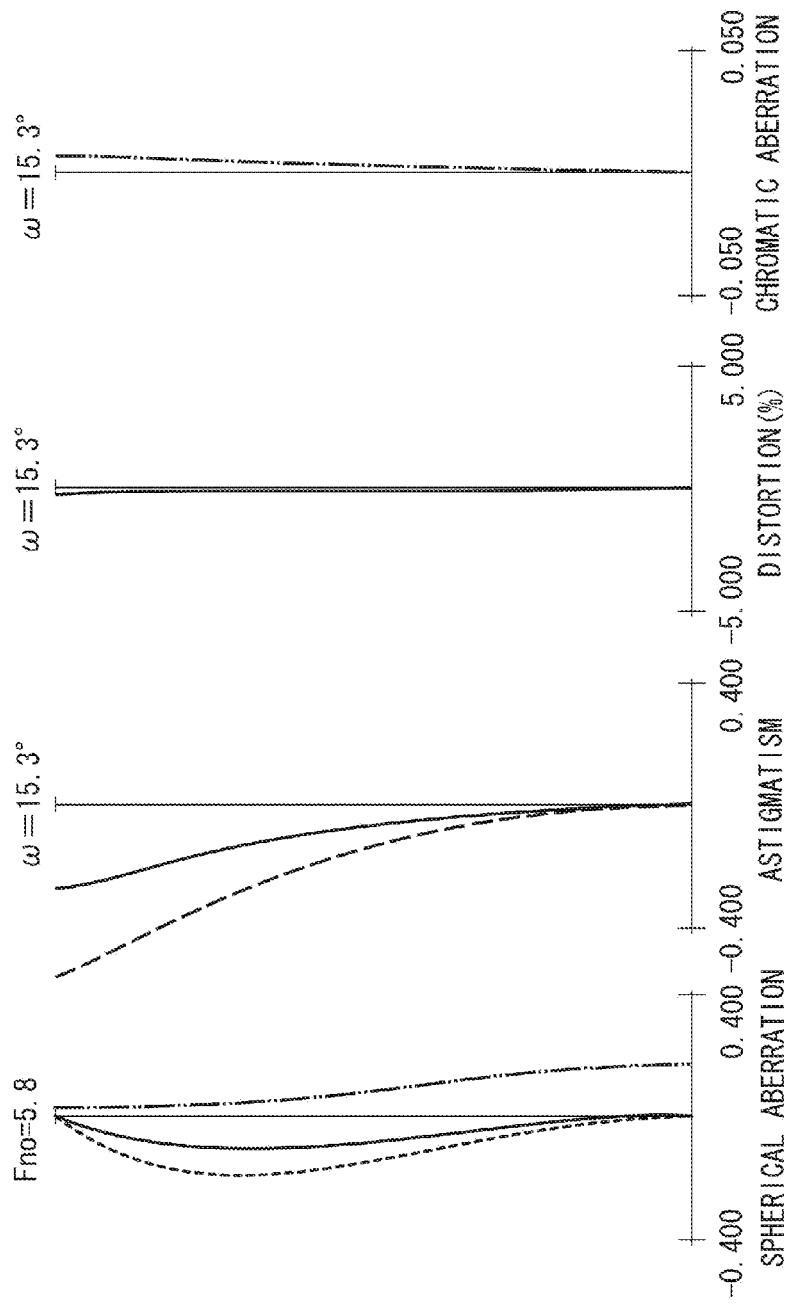

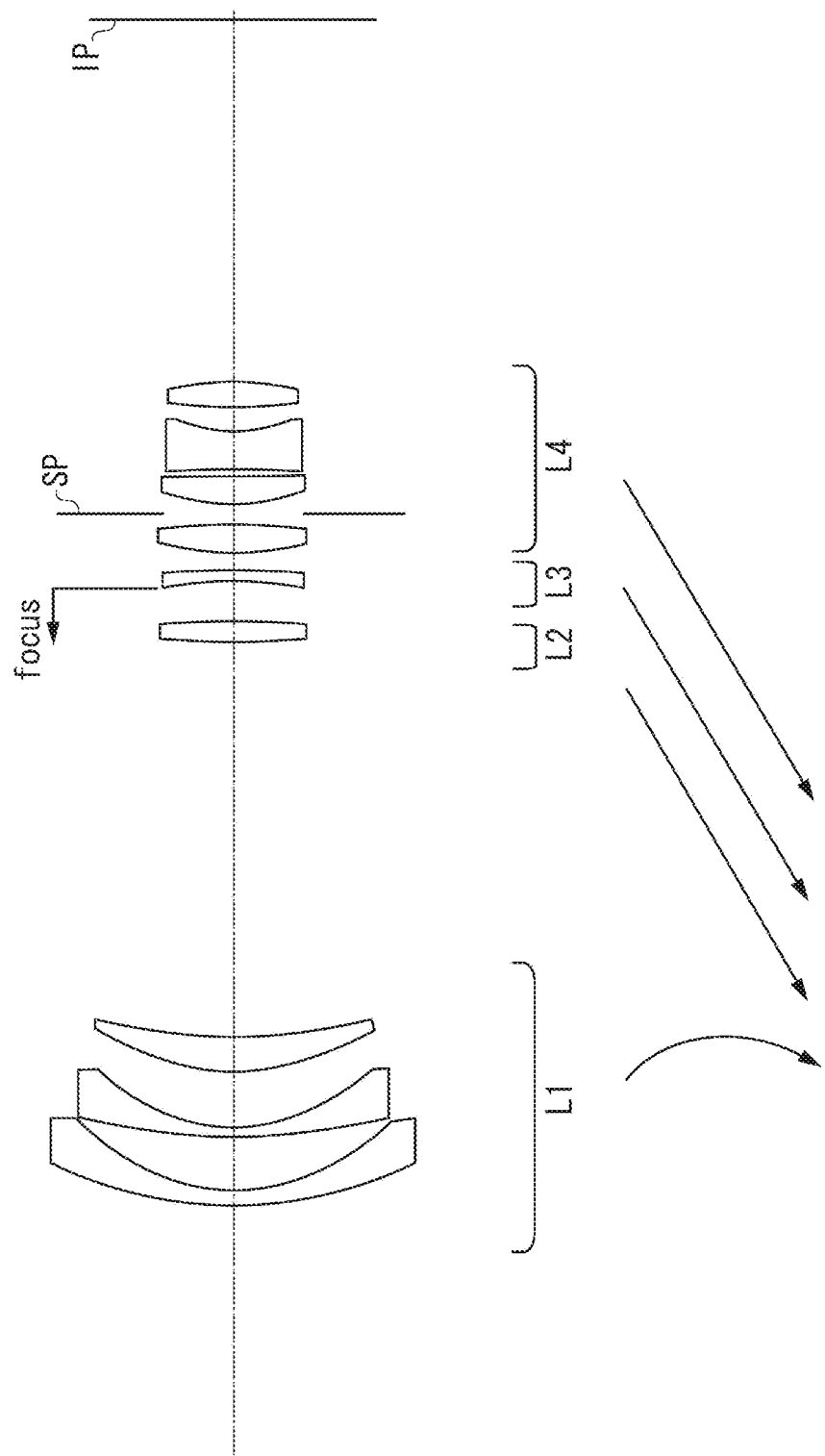

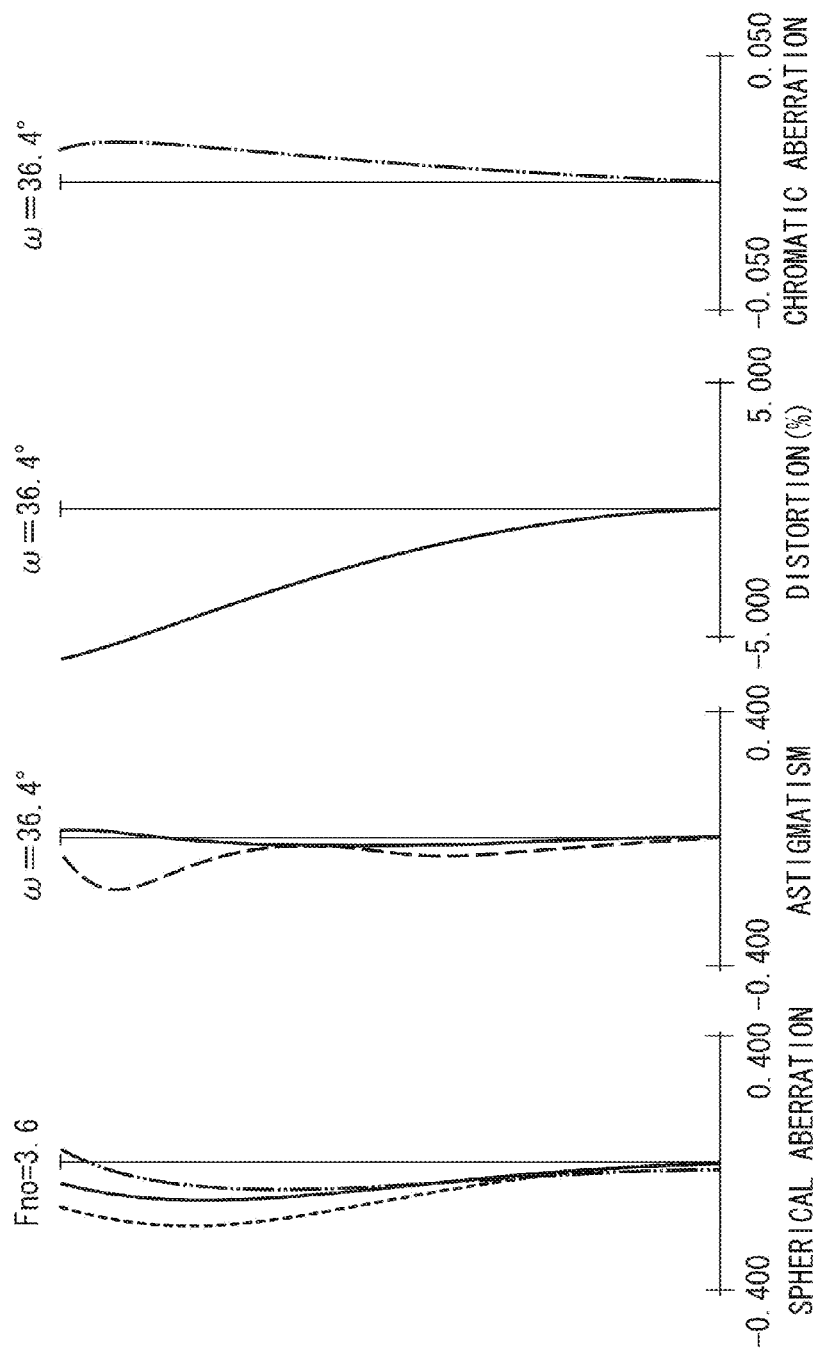

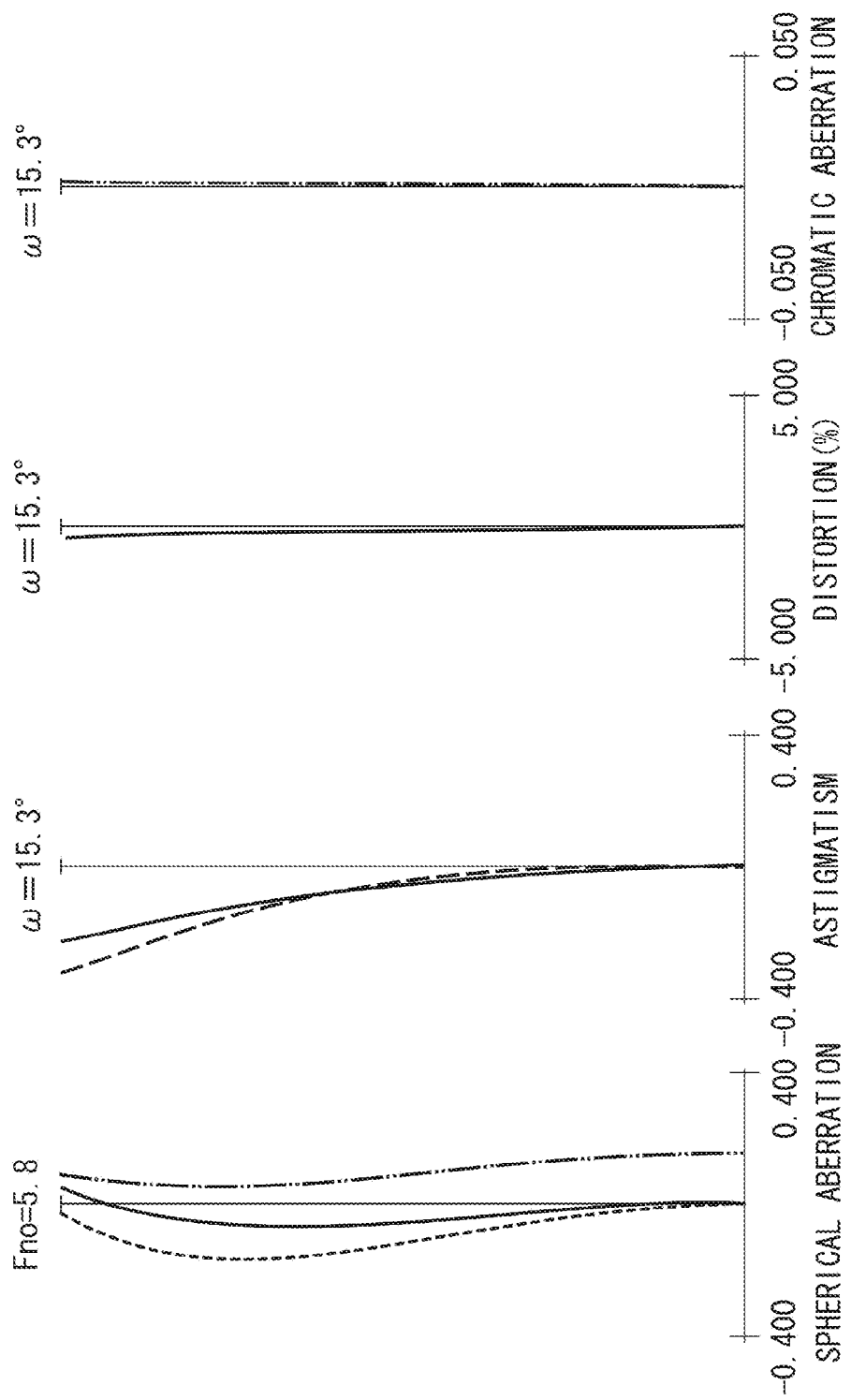

ZOOM LENS AND IMAGE PICKUP APPARATUS HAVING THE SAME

BACKGROUND OF THE INVENTION

1. Field of the Invention

The present invention relates to a zoom lens, which is adaptable to an image pickup apparatus using an image sensor, such as a digital still camera, video camera, TV camera, or monitoring camera.

2. Description of the Related Art

A photographic optical system used for an image pickup apparatus includes a zoom lens which should preferably provide the following features: short total lens length, compact size, wide angle of view, and high optical performance with a high zoom ratio. Such a photographic optical system also provides a focusing function. Therefore, it is also desired that a focus lens unit be compact and lightweight to attain high-speed and high-precision automatic focus.

It is important to appropriately set a zoom type, refractive power of each lens unit, and a lens configuration to downsize an entire zoom lens and to realize high-speed focusing with a compact and lightweight lens unit, while attaining a wide angle of view.

As a zoom lens of a negative lead type, in which a lens unit having negative refractive power is arranged closest to the object side, a five-unit zoom lens has been known. Examples are disclosed in U.S. Pat. No. 8,189,074, and U.S. Patent Application Publication No. 2010/0091170. In the five-unit zoom lens, a lens unit having negative refractive power, a lens unit having positive refractive power, a lens unit having positive refractive power, a lens unit having negative refractive power, and a lens unit having positive refractive power are arranged in order from an object side to an image side. In the five-unit zoom lens, a lightweight second lens unit having relatively a small diameter is regarded as a focus lens unit. When a lens unit formed by combining the second lens unit and a third lens unit is considered to be a lens unit having positive refractive power, a principal point position might be greatly shifted to the object side, compared to a second lens unit having positive refractive power in a general four-unit zoom lens in which a lens unit having negative refractive power, a lens unit having positive refractive power, a lens unit having negative refractive power, and a lens unit having positive refractive power are arranged. It is particularly difficult to secure back focus at the wide-angle end. The five-unit zoom lens described above also tends to have strong refractive power of each lens unit. Therefore, an appropriate refractive power arrangement for correcting aberration variation during zooming cannot be made, which makes it difficult to realize high performance and miniaturization.

A four-unit zoom lens has also been known, for example, from Japanese Patent Application Laid-Open No. 2003-131130, and Japanese Patent Application Laid-Open No. 2001-343584. In the four-unit zoom lens described above, a lens unit having negative refractive power, a lens unit having positive refractive power, a lens unit having negative refractive power, and a lens unit having positive refractive power are arranged in order from an object side to an image side. In the four-unit zoom lens described above, a compact and lightweight third lens unit moves during focusing. When the number of lenses in the focus lens unit is reduced to downsize the zoom lens, and the refractive power of the focus lens unit is set to be too strong, residual aberration of the focus lens unit might be large, so that aberration variation might increase during focusing.

SUMMARY OF THE INVENTION

The present invention is directed to a zoom lens that has a wide angle of view and high optical performance, and that facilitates high-speed focusing.

According to an aspect of the present invention, a zoom lens includes, in order from an object side to an image side, a first lens unit having negative refractive power, a second lens unit having positive refractive power, a third lens unit having negative refractive power, and a fourth lens unit having positive refractive power, wherein each lens unit moves during zooming, wherein the third lens unit moves toward the object side during focusing from an infinitely-distant object to a nearby object, and wherein, when a focal length of the third lens unit is f3, a composite focal length of the first lens unit and the second lens unit at a telephoto end is f12t, a focal length of the entire zoom lens at a wide-angle end is fw, and a focal length of the entire zoom lens at the telephoto end is ft, conditions below are satisfied:

$$-1.50 < ft/f12t < -0.05$$

$$-1.20 < \sqrt{(fw \cdot ft)}/f3 < -0.20.$$

Further features of the present invention will become apparent from the following description of exemplary embodiments with reference to the attached drawings.

BRIEF DESCRIPTION OF THE DRAWINGS

FIG. 1 is a lens cross-sectional view at a wide-angle end according to a first exemplary embodiment.

FIGS. 2A and 2B are aberration diagrams at the wide-angle end and a telephoto end, respectively, according to the first exemplary embodiment.

FIG. 3 is a lens cross-sectional view at a wide-angle end according to a second exemplary embodiment.

FIGS. 4A and 4B are aberration diagrams at the wide-angle end and a telephoto end, respectively, according to the second exemplary embodiment.

FIG. 5 is a lens cross-sectional view at a wide-angle end according to a third exemplary embodiment.

FIGS. 6A and 6B are aberration diagrams at the wide-angle end and a telephoto end, respectively, according to the third exemplary embodiment.

FIGS. 8A and 8B are aberration diagrams at the wide-angle end and a telephoto end, respectively, according to the fourth exemplary embodiment.

FIG. 11 is a lens cross-sectional view at a wide-angle end according to a sixth exemplary embodiment.

FIGS. 12A and 12B are aberration diagrams at the wide-angle end and a telephoto end, respectively, according to the sixth exemplary embodiment.

DESCRIPTION OF THE EMBODIMENTS

Various exemplary embodiments, features, and aspects of the invention will be described in detail below with reference to the drawings.

A zoom lens according to exemplary embodiments of the present invention includes a first lens unit having negative refractive power, a second lens unit having positive refractive power, a third lens unit having negative refractive power, and a fourth lens unit having positive refractive power in order from an object side to an image side. Each lens unit moves during zooming, and the third lens unit moves toward the object side during focusing from an infinitely-distant object to a nearby object.

Figure 7:
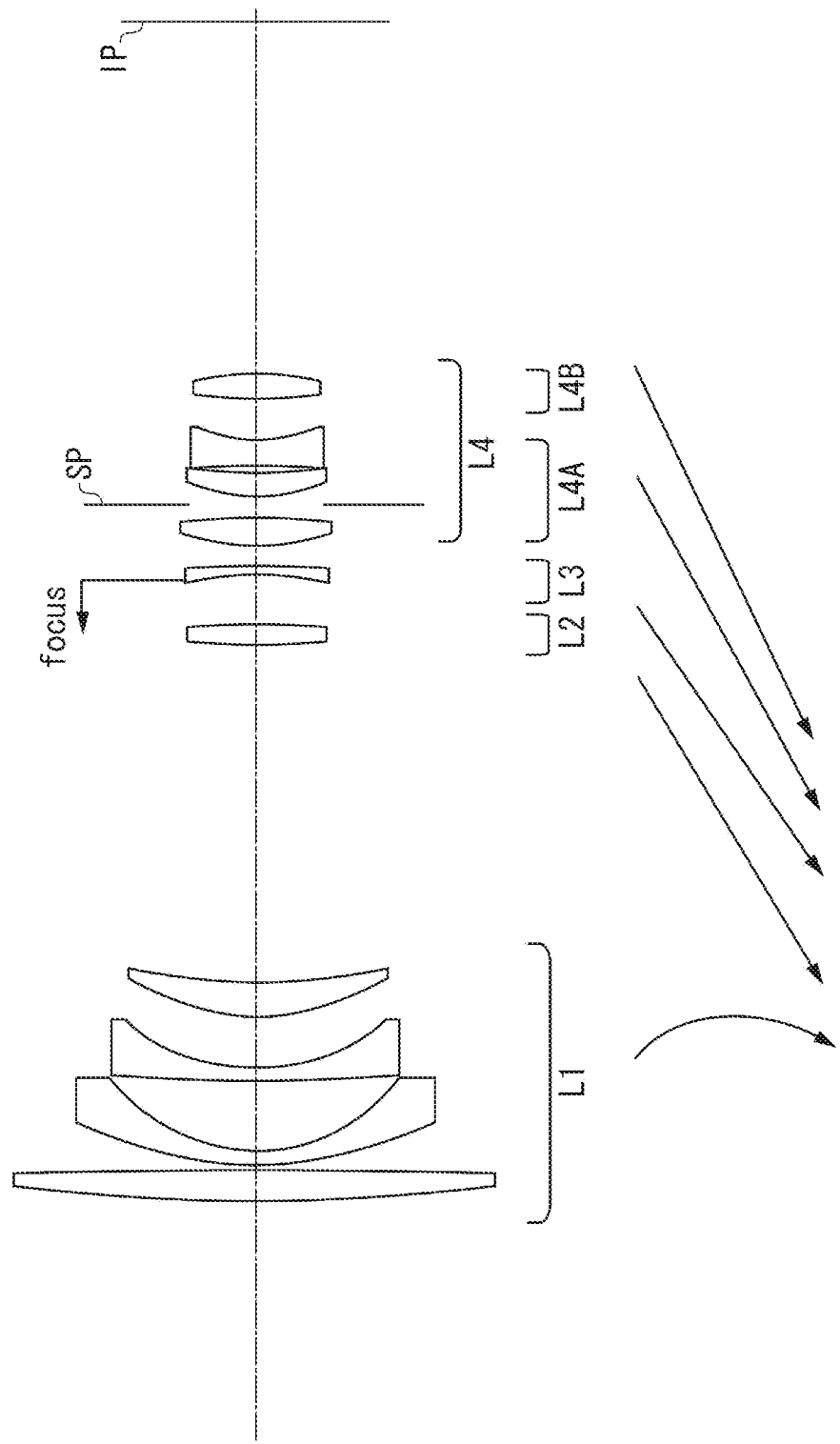
FIG. 7 is a lens cross-sectional view at a wide-angle end according to a fourth exemplary embodiment.
Figure 9:
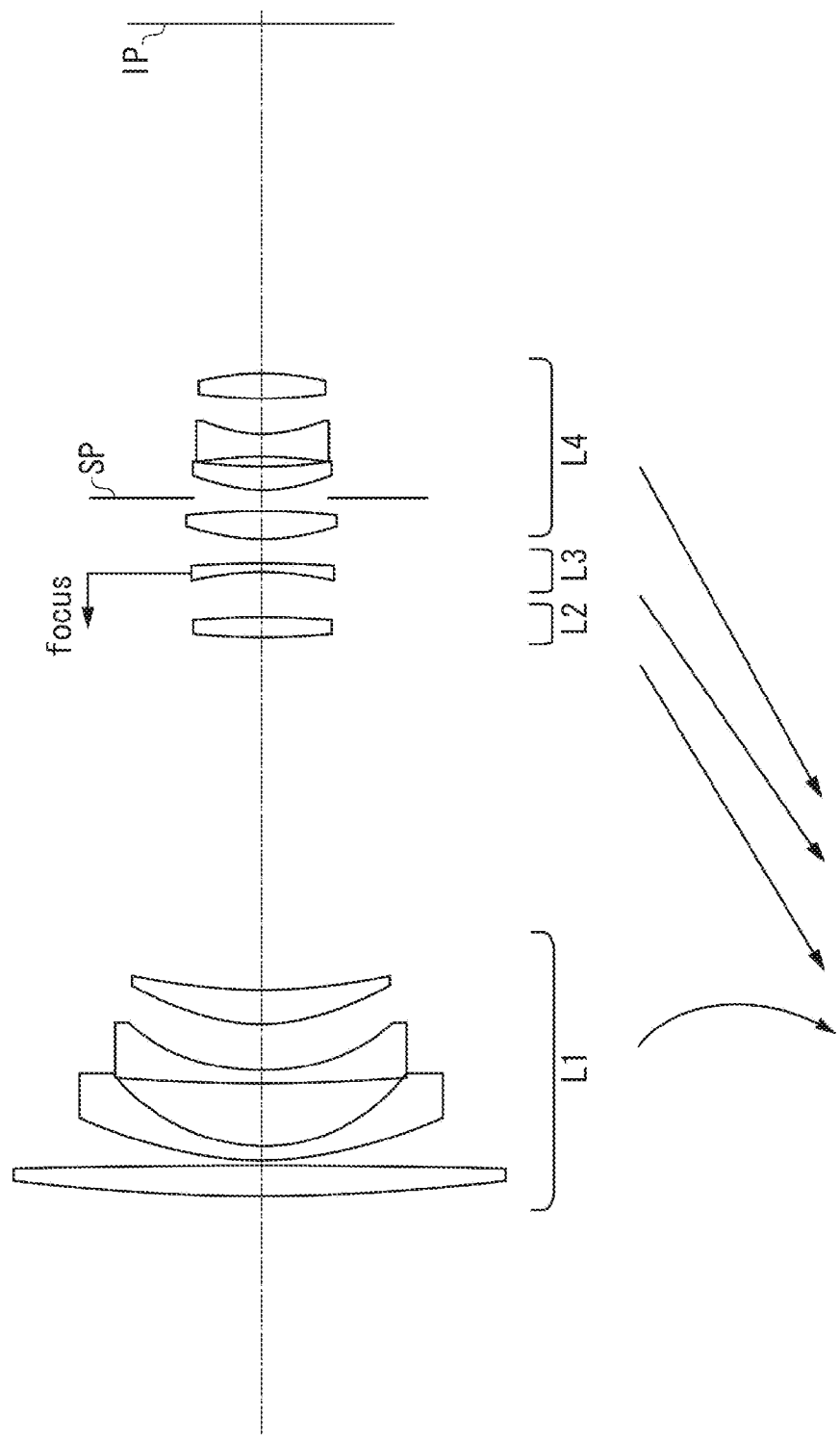
FIG. 9 is a lens cross-sectional view at a wide-angle end according to a fifth exemplary embodiment.
Figure 10A:
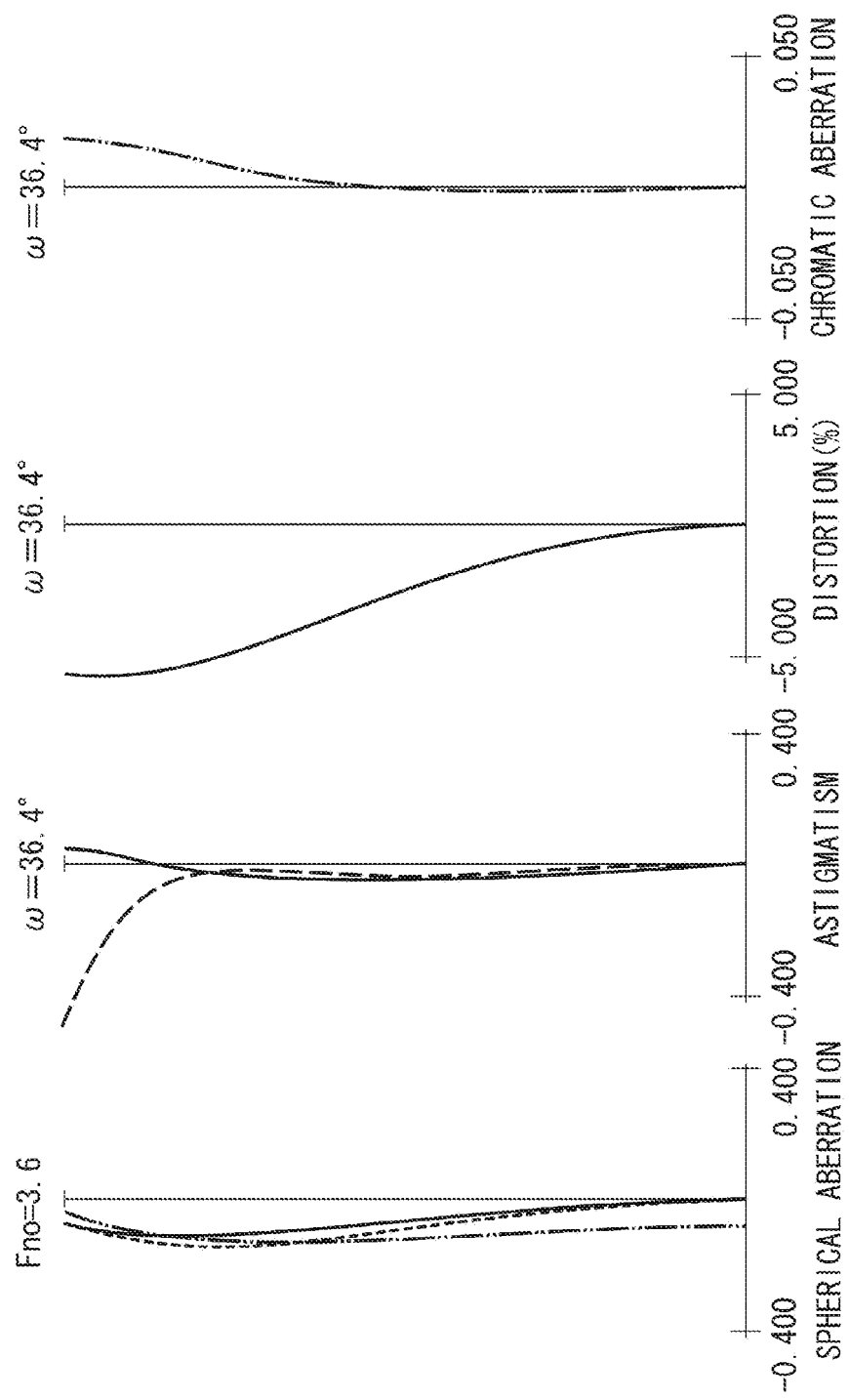
FIGS. 10A and 10B are aberration diagrams at the wide-angle end and a telephoto end, respectively, according to the fifth exemplary embodiment.
Figure 10B:
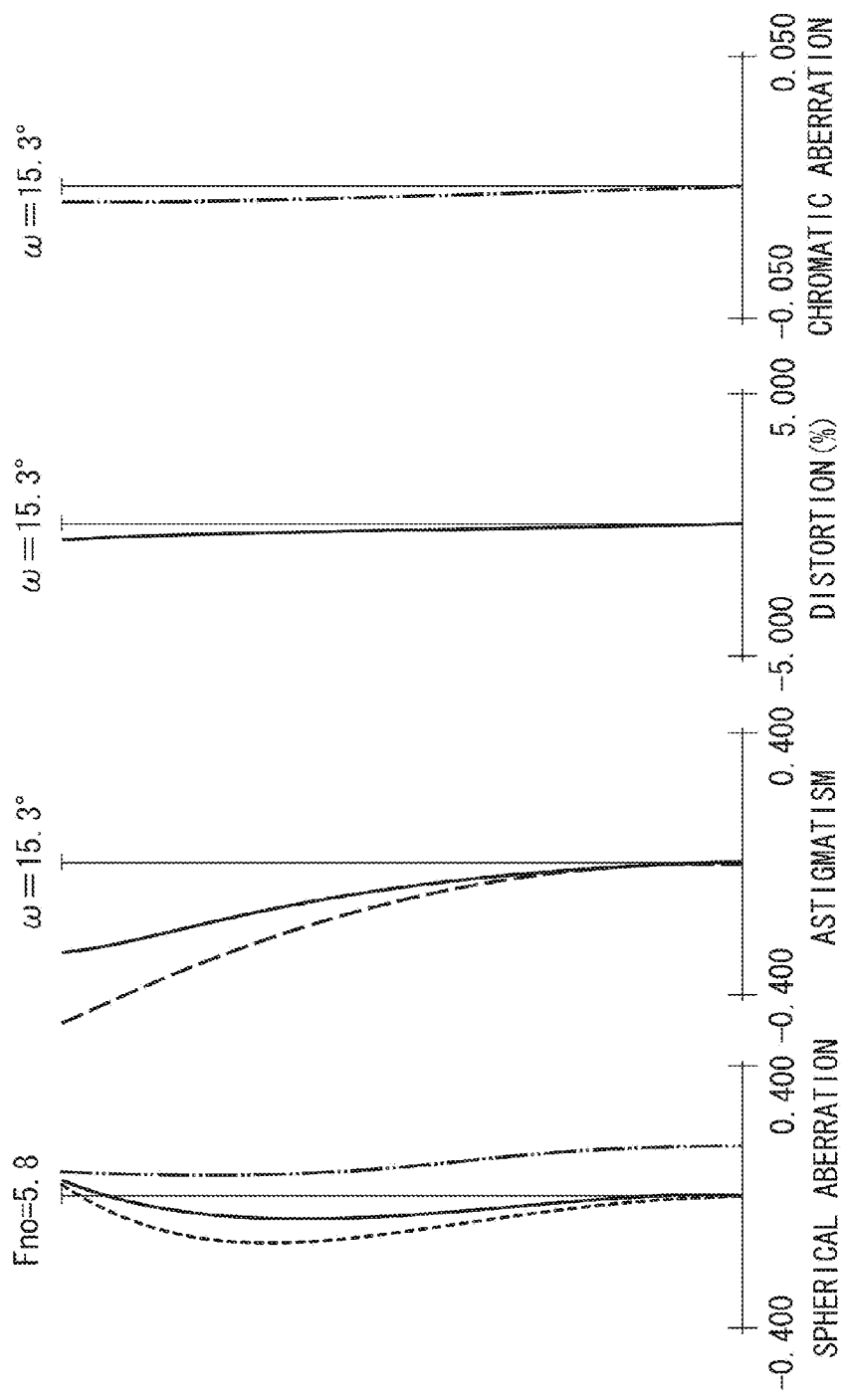
Figure 13:
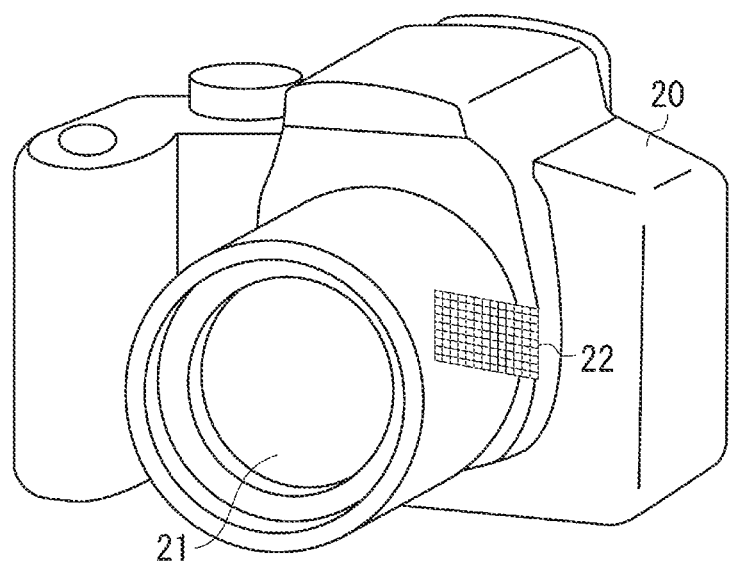
FIG. 13 is a schematic view of main components of a camera (image pickup apparatus) including a zoom lens according to an exemplary embodiment of the present invention.

FIGS. 1, 3, 5, 7, 9, and 11 are lens cross-sectional views of a zoom lens according to first to sixth exemplary embodiments of the present invention, respectively, at a wide-angle end (short focal length end). FIGS. 2A and 2B are aberration diagrams according to the first exemplary embodiment of the present invention; FIGS. 4A and 4B for the second exemplary embodiment of the present invention; FIGS. 6A and 6B for the third exemplary embodiment of the present invention; FIGS. 8A and 8B for the fourth exemplary embodiment of the present invention; FIGS. 10A and 10B for the fifth exemplary embodiment of the present invention; and FIGS. 12A and 12B for the second exemplary embodiment of the present invention. FIGS. 2A, 4A, 6A, 8A, 10A, and 12A are aberration diagrams at a wide-angle end, while FIGS. 2B, 4B, 6B, 8B, 10B, and 12B are aberration diagrams at a telephoto end (long focal length end). FIG. 13 is a schematic view of main components of a camera (image pickup apparatus) including a zoom lens according to an exemplary embodiment of the present invention. The zoom lens in each exemplary embodiment is a photographic lens system used for an image pickup apparatus such as a video camera, a digital still camera, a silver-halide film camera, or a TV camera.

In each lens cross-sectional view, the left side is an object side (front side), while the right side is an image side (back side). In each lens cross-sectional view, Li indicates the i-th lens unit, when i is an order of a lens unit from the object side. SP indicates an aperture stop. IP indicates an image plane. When the zoom lens is used as a photographic optical system of a digital camera, a video camera, or a monitoring camera, the image plane IP corresponds to an imaging surface of a solid-state image sensor (photoelectric conversion element) such as a charge-coupled device (CCD) sensor or a complementary metal-oxide semiconductor (CMOS) sensor. When the zoom lens is used as a photographic optical system of a silver-halide film camera, the image plane IP corresponds to a film surface.

Arrows indicate a moving locus of each lens unit during zooming from the wide-angle end to the telephoto end. Arrows involved with focusing indicate the moving direction of each lens unit during focusing from the infinitely-distant object to the nearby object. In a spherical aberration diagram, a solid line, a two-dot chain line, and a dotted line refer to the d-line, g-line, and C-line, respectively. In an astigmatism diagram, a dotted line and a solid line refer to a meridional image plane and a sagittal image plane, respectively. In a diagram of chromatic aberration of magnification (lateral chromatic aberration), a two-dot chain line refers to the g-line. ω is a half angle of view (degree), and Fno is an F-number. In each exemplary embodiment, the wide-angle end and the telephoto end mean zoom positions when a zooming lens unit is located on either one of both ends of a range in which the zooming lens can move on an optical axis in a mechanism.

To downsize the focus lens unit in a zoom lens of a negative lead type in which a lens unit having negative refractive power is arranged on the most object side, the second lens unit having a small lens diameter or the subsequent lens units can be selected as the focus lens unit. To reduce weight, the focus lens unit can include one or two lenses.

To prevent aberration variation during focusing when the focus lens unit is formed by using a few lenses, the refractive power of the focus lens unit needs to be set weak. However, when the refractive power of the focus lens unit is set to be too weak, an amount of movement of the focus lens unit during focusing from an infinitely-distant object to a nearby object increases, which might increase the size of the entire zoom lens. It becomes important to appropriately set the refractive power of the focus lens unit for reducing aberration variation during focusing, to realize high optical performance, while realizing the compact and lightweight focus lens unit and miniaturization of the entire zoom lens.

In the zoom lens according to each exemplary embodiment, it is assumed that the focal length of the third lens unit L3 is f3, the composite focal length of the first lens unit L1 and the second lens unit L2 at the telephoto end is f12t, the focal length of the entire zoom lens at the wide-angle end is fw, and the focal length of the entire zoom lens at the telephoto end is ft. In this case, each exemplary embodiment satisfies the following conditions:

$$-1.50 < ft/f12t < -0.05 \quad (1)$$

$$-1.20 < \sqrt{(fw \cdot ft)}/f3 < -0.20 \quad (2)$$

In each exemplary embodiment, the third lens unit L3 having negative refractive power and following the first lens unit L1 having negative refractive power and the second lens unit L2 having positive refractive power is specified as the focus lens unit. The third lens unit L3 having a relatively small effective lens diameter is specified as the focus lens unit. On-axis ray incident on the focus lens unit is appropriately set, whereby a variation in height of the on-axis ray caused by focusing is reduced to reduce the aberration variation during focusing. Accordingly, the focus lens unit is formed by using a few lenses with the refractive power of the focus lens unit being appropriately set, whereby the weight of the focus lens unit can be reduced.

In each exemplary embodiment, the zoom lens satisfies both the conditions (1) and (2). According to the condition (1), the refractive power of the first lens unit L1 and the refractive power of the second lens unit L2 at the telephoto end are appropriately set. With this configuration, the incident position of a light flux on the third lens unit L3 that is the focus lens unit is appropriately set, which realizes satisfactory optical performance.

When the numerical value exceeds the lower limit of the condition (1), the divergence effect of the on-axis ray incident on the third lens unit L3 becomes too strong. Therefore, when the focus lens unit includes a few lenses, it becomes difficult to prevent the aberration variation during focusing. When the numerical value exceeds the upper limit of the condition (1), the divergence effect of the on-axis ray incident on the third lens unit L3 becomes too weak. Therefore, the refractive power of the second lens unit L2 becomes strong, so that it becomes difficult to prevent the aberration variation during zooming.

The condition (2) aims to downsize the entire zoom lens with high optical performance being attained, by appropriately setting the refractive power of the third lens unit L3. When the numerical value exceeds the lower limit of the condition (2), the refractive power of the third lens unit L3 becomes too strong. Therefore, when the focus lens unit includes a few lenses, it becomes difficult to prevent the aberration variation during focusing. When the numerical value exceeds the upper limit of the condition (2), the refractive power of the third lens unit L3 becomes too weak. Therefore, the amount of movement during focusing increases, and the focusing speed decreases. This is undesirable.

In addition, the size of the entire zoom lens increases, which is not favorable. Also, the numerical ranges in the conditions (1) and (2) can be set as follows:

$$-1.00 < ft/f12t < -0.30 \tag{1a}$$

$$-0.90 < \sqrt{(fw \cdot ft)}/f3 < -0.40 \tag{2a}$$

As described above, the refractive power of each lens unit and the lens configuration are appropriately set in each exemplary embodiment. Accordingly, the zoom lens that is downsized, that can be used for any image pickup apparatus, and that can easily realize inner focus can be provided. Meanwhile, the zoom lens in each exemplary embodiment can satisfy one or more of conditions described below. This brings an effect corresponding to the respective condition.

f1 represents the focal length of the first lens unit L1, and f2 represents the focal length of the second lens unit L2. β3w represents a paraxial lateral magnification of the third lens unit L3 at the wide-angle end, and β3t represents a paraxial lateral magnification of the third lens unit L3 at the telephoto end. r3a represents a radius of curvature of a lens surface of the third lens unit L3 on the most object side, and r3b represents a radius of curvature of a lens surface of the third lens unit L3 on the most image side.

D2w represents an air distance between the second lens unit L2 and the third lens unit L3 at the wide-angle end, and D3w represents an air distance between the third lens unit L3 and the fourth lens unit L4 at the wide-angle end. D2t represents an air distance between the second lens unit L2 and the third lens unit L3 at the telephoto end, and D3t represents an air distance between the third lens unit L3 and the fourth lens unit L4 at the telephoto end.

β4w represents a paraxial lateral magnification of the fourth lens unit L4 at the wide-angle end, and β4t represents a paraxial lateral magnification of the fourth lens unit L4 at the telephoto end. The second lens unit L2 includes a single positive lens, and f2 represents the focal length of the second lens unit L2. The third lens unit L3 includes a single negative lens. In this case, the zoom lens can satisfy one or more of the conditions as follows:

$$-1.00 < f1/f2 < -0.10 \tag{3}$$

$$0.005 < (\beta 3w)^2 < 0.200 \tag{4}$$

$$0.010 < (\beta 3t)^2 < 0.200 \tag{5}$$

$$0.20 < (r3b - r3a)/(r3a + r3b) < 2.00 \tag{6}$$

$$0.05 < D3w/D2w < 0.80 \tag{7}$$

$$0.05 < D3t/D2t < 0.80 \tag{8}$$

$$0.60 < (\beta 4t \cdot fw)/(\beta 4w \cdot ft) < 1.40 \tag{9}$$

$$0.10 < fw/f2 < 0.40 \tag{10}$$

$$0.20 < |fw/f3| < 0.60 \tag{11}$$

A technical meaning of each condition will be described next. The condition (3) relates to the ratio of the focal length of the first lens unit L1 to the focal length of the second lens unit L2. The condition (3) aims to prevent the aberration variation during focusing and to reduce the size and weight of the focus lens unit.

When the refractive power of the second lens unit L2 becomes too weak with the upper limit of the condition (3) exceeded, the object-side principal point position of the case where the second lens unit L2 and the third lens unit L3 are regarded as a combined single lens unit is located nearer to the image-plane side. Therefore, when a desired zoom ratio is required, it becomes difficult to secure the air distance between the first lens unit L1 and the second lent unit L2 at the telephoto end. This is undesirable. When the refractive power of the second lens unit L2 becomes too strong with the lower limit exceeded, spherical aberration is much generated from the second lens unit L2 during focusing. It is difficult to correct this spherical aberration by the third lens unit L3, which keeps a compact size and reduced weight and serves as the focus lens unit.

The zoom lens can satisfy both the conditions (4) and (5). To reduce the size and weight of the focus lens unit, it is necessary to appropriately set the refractive power of the focus lens unit, and to appropriately set focus sensitivity. The conditions (4) and (5) are set for appropriately setting the focus sensitivity to prevent the aberration variation during focusing, and to reduce the number of lenses forming the focus lens unit.

When the paraxial lateral magnification of the third lens unit L3 becomes too small with the lower limit of the condition (4) exceeded, spherical aberration is much generated from the second lens unit L2, particularly, at the wide-angle end. It is difficult to correct this spherical aberration by the third lens unit L3, which keeps the compact size and reduced weight and serves as the focus lens unit. When the paraxial lateral magnification of the third lens unit L3 becomes too large with the upper limit of the condition (4) exceeded, the height of the on-axis ray passing through the second lens unit L2 and the height of the on-axis ray passing through the third lens unit L3 tend to be different from each other. Therefore, it becomes difficult to prevent the aberration variation at the wide-angle end during focusing.

When the paraxial lateral magnification of the third lens unit L3 becomes too small with the lower limit of the condition (5) exceeded, spherical aberration is much generated from the second lens unit L2, particularly, at the telephoto end. It is difficult to correct this spherical aberration by the third lens unit L3, which keeps the compact size and reduced weight and serves as the focus lens unit. When the paraxial lateral magnification of the third lens unit L3 becomes too large with the upper limit of the condition (5) exceeded, the height of the on-axis ray passing through the second lens unit L2 and the height of the on-axis ray passing through the third lens unit L3 tend to be different from each other. Therefore, it becomes difficult to prevent the aberration variation at the telephoto end during focusing.

The condition (6) relates to the radius of curvature of the most object-side lens surface of the third lens unit L3, and the radius of curvature of the most image-plane-side lens surface of the third lens unit L3. The condition (6) is set to realize the miniaturization of the entire zoom lens and the high performance in a well-balanced manner.

When the numerical value exceeds the lower limit of the condition (6), the correction of spherical aberration of the third lens unit L3 is insufficient. Especially, it becomes difficult to correct spherical aberration at the telephoto end. When the numerical value exceeds the upper limit of the condition (6), the curvature of the most object-side lens surface of the third lens unit L3 becomes too strong. Especially, spherical aberration at the telephoto end is excessively corrected. The third lens unit L3 moves toward the object side during focusing from an infinitely-distant object to a nearby object. Therefore, when the curvature of the most object-side lens surface of the third lens unit L3 becomes too strong, the total lens length increases to secure the air distance between the second lens unit L2 and the third lens unit L3. This is undesirable.

The condition (7) relates to the ratio of the air distance between the second lens unit L2 and the third lens unit L3 and the air distance between the third lens unit L3 and the fourth lens unit L4 at the wide-angle end. The condition (7) is set to realize the miniaturization of the entire zoom lens and the high performance. When the numerical value exceeds the lower limit of the condition (7), the distance between the second lens unit L2 and the third lens unit L3 increases. Therefore, the height of the on-axis ray passing through the second lens unit L2 and the height of the on-axis ray passing through the third lens unit L3 tend to be different from each other, resulting in that the aberration variation at the wide-angle end during focusing increases. In addition, the total lens length increases at the wide-angle end. When the numerical value exceeds the upper limit, the effective diameter of the fourth lens unit L4 increases.

The condition (8) relates to the ratio of the air distance between the second lens unit L2 and the third lens unit L3 and the air distance between the third lens unit L3 and the fourth lens unit L4 at the telephoto end. The condition (8) is set to realize the miniaturization of the entire zoom lens and the high performance. When the numerical value exceeds the lower limit of the condition (8), the distance between the second lens unit L2 and the third lens unit L3 increases. Therefore, the height of the on-axis ray passing through the second lens unit L2 and the height of the on-axis ray passing through the third lens unit L3 tend to be different from each other, resulting in that the aberration variation at the telephoto end during focusing increases. In addition, the total lens length increases at the telephoto end. When the numerical value exceeds the upper limit, the effective diameter of the fourth lens unit L4 increases.

The condition (9) relates to the paraxial lateral magnification of the fourth lens unit L4 at the wide-angle end and at the telephoto end. The condition (9) is set for appropriately setting the zooming share of the fourth lens unit L4. When the numerical value exceeds the lower limit of the condition (9), the zooming share of the fourth lens unit L4 becomes too small. Therefore, the zooming share of the second lens unit L2 and the third lens unit L3 becomes too large, resulting in that it becomes difficult to allow the second lens unit L2 and the third lens unit L3 to maintain the high optical performance with a simple lens configuration. When the numerical value exceeds the lower limit of the condition (9), the zooming share of the fourth lens unit L4 becomes too large. Therefore, the refractive power of the fourth lens unit L4 increases. Especially, the image plane variation increases during zooming, and correcting this variation is difficult.

In each exemplary embodiment, an aperture stop SP is provided in the fourth lens unit L4. To reduce the size and weight of the focus lens unit, the aperture stop can be provided near the third lens unit L3. This structure reduces the distance variation of the height of the incident off-axis ray, thereby easily preventing the aberration variation during focusing. The third lens unit L3 moves toward the object side during focusing from an infinitely-distant object to a nearby object. Therefore, the aperture stop SP is arranged in the fourth lens unit L4, which is located close to the image-plane side than the third lens unit L3, to prevent the interference between the aperture stop SP and the third lens unit L3. This configuration enhances the space efficiency, whereby the miniaturization of the entire zoom lens can be realized.

The zoom lens is configured such that the second lens unit L2 includes a single positive lens, and simultaneously, the zoom lens satisfies the condition (10). The thickness of the lens in the second lens unit L2 can be reduced to reduce the total lens length. However, when the second lens unit L2 is formed by using a single lens, the refractive power of the second lens unit L2 needs to be appropriately set for realizing the miniaturization of the entire zoom lens and high performance.

When the numerical value exceeds the lower limit of the condition (10), the refractive power of the second lens unit L2 becomes too weak, so that the total lens length increases. When the numerical value exceeds the upper limit of the condition (10), the refractive power of the second lens unit L2 becomes too strong, so that the correction of spherical aberration at the telephoto end is especially insufficient.

The zoom lens is configured such that the third lens unit L3 includes a negative lens, and simultaneously, the zoom lens satisfies the condition (11). The third lens unit L3 can be formed by using a single lens to reduce the total lens length and to reduce the weight of the focus lens unit. However, when the third lens unit L3 is formed by using a single lens, the refractive power of the third lens unit L3 needs to be appropriately set for realizing the miniaturization of the entire system and high performance.

When the numerical value exceeds the lower limit of the condition (11), the refractive power of the third lens unit L3 becomes too weak, so that the amount of movement of the third lens unit L3 during focusing from an infinitely-distant object to a nearby object increase. Therefore, the total lens length increases. When the numerical value exceeds the upper limit of the condition (11), the refractive power of the third lens unit L3 becomes too strong, so that the correction of spherical aberration at the telephoto end is especially insufficient. In addition, the ranges of the numerical values in the conditions (3) to (11) can be set as follows:

$$-0.60 < f1/f2 < -0.25 \tag{3a}$$

$$0.007 < (\beta 3w)^2 < 0.100 \tag{4a}$$

$$0.020 < (\beta 3t)^2 < 0.150 \tag{5a}$$

$$0.40 < (r3b - r3a)/(r3a + r3b) < 1.40 \tag{6a}$$

$$0.20 < D3w/D2w < 0.70 \tag{7a}$$

$$0.10 < D3t/D2t < 0.60 \tag{8a}$$

$$0.7 < (\beta 4t \cdot fw)/(\beta 4w \cdot ft) < 1.2 \tag{9a}$$

$$0.15 < fw/f2 < 0.35 \tag{10a}$$

$$0.25 < |fw/f3| < 0.55 \tag{11a}$$

As described above, each exemplary embodiment can provide a zoom lens that has satisfactory optical performance in the entire zoom region and in the entire focus region, while having a compact and lightweight focusing mechanism, and that is entirely compact and lightweight.

Favorable configurations other than the configuration described above in each embodiment will be described next. The first lens unit L1 moves with a locus convex toward the image side during zooming from the wide-angle end to the telephoto end. This configuration decreases the total lens length. The increase in the total lens length at the wide-angle end is suppressed, whereby the increase in the lens effective diameter of the first lens unit L1, which has the largest lens effective diameter, is prevented.

The second lens unit L2, the third lens unit L3, and the fourth lens unit L4 move toward the object side during zooming from the wide-angle end to the telephoto end. This configuration prevents the increase in the total lens length at the wide-angle end, thereby preventing the increase in the lens effective diameter of the first lens unit L1, which has the largest lens effective diameter.

An image pickup apparatus including a zoom lens according to an exemplary embodiment of the present invention includes a defocus direction detection unit that detects a defocus direction by vibrating the focus lens unit in the optical axis direction. The image pickup apparatus further includes a calculation unit that calculates the position of the focus lens unit in the optical axis direction where in-focus state is available, based on image information acquired by the image sensor. In each exemplary embodiment, a lens unit that is a part of the fourth lens unit L4 may move in a direction having a component perpendicular to the optical axis to correct image shake caused by camera shake.

The lens configuration of each exemplary embodiment will be described below. The zoom lens in the first exemplary embodiment includes the first lens unit L1 having negative refractive power, the second lens unit L2 having positive refractive power, the third lens unit L3 having negative refractive power, and the fourth lens unit L4 having positive refractive power and including the aperture stop SP, in order from the object side to the image side. The zoom lens in the first exemplary embodiment is a four-unit zoom lens with a zoom ratio of 2.7 and F-number of 3.60 to 5.80. In the first exemplary embodiment, the second lens unit L2 and the fourth lens unit L4 move with the same locus during zooming to simplify the mechanical structure. However, they may move with different loci.

The third lens unit L3 moves toward the object side during focusing from an infinitely-distant object to a nearby object. The third lens unit L3 includes a single lens to realize miniaturization and reduced weight, and to facilitate high-speed focusing. The second lens unit L2 includes a single lens to realize miniaturization and reduced weight of the entire zoom lens.

The composite focal length of the first lens unit L1 and the second lens unit L2 is negative at the telephoto end, and the zoom lens satisfies the condition (1). The second lens unit L2 and the third lens unit L3 effectively have a focal relationship at the telephoto end for reducing the variation in spherical aberration and the variation in axial chromatic aberration during focusing by use of the third lens unit L3. This configuration brings high optical performance. The refractive power of the third lens unit L3 is set in order that the zoom lens satisfies the condition (1) as well as the condition (2).

This configuration easily makes the third lens unit L3 have a simple lens configuration, which contributes to the miniaturization and reduced weight. It is also configured that the appropriate focus sensitivity can be obtained. The aperture stop SP is arranged in the fourth lens unit L4. The aperture stop SP may be arranged on the most object-side of the fourth lens unit L4. However, to avoid the interference with the focusing mechanism of the third lens unit L3, the aperture stop SP can be arranged in the fourth lens unit L4.

The second exemplary embodiment is similar to the first exemplary embodiment in the arrangement of the refractive power of each lens unit, the zooming method, and the focusing method. The lens configuration of each lens unit in the second exemplary embodiment is also similar to that in the first exemplary embodiment. The zoom lens in the second exemplary embodiment is a four-unit zoom lens with a zoom ratio of 2.92 and F-number of 3.49 to 5.80.

The zoom lens in the third exemplary embodiment includes the first lens unit L1 having negative refractive power, the second lens unit L2 having positive refractive power, the third lens unit L3 having negative refractive power, a lens subunit L4A having positive refractive power and including the aperture stop SP, and a lens subunit 4B having positive refractive power, in order from the object side to the image side. The fourth lens unit L4 includes the lens subunit L4A having positive refractive power, and the lens subunit L4B having positive refractive power, the lens subunit L4A and the lens subunit L4B moving with different loci during zooming.

The zoom lens in the third exemplary embodiment is a five-unit zoom lens with a zoom ratio of 3.09 and F-number of 3.47 to 5.80. In the third exemplary embodiment, the second lens unit L2 and the lens subunit L4A move with the same locus during zooming to simplify the mechanical structure. However, they may move with different loci.

The third lens unit L3 moves toward the object side during focusing from an infinitely-distant object to a nearby object. The third lens unit L3 includes a single lens to realize miniaturization and reduced weight, and to facilitate high-speed focusing.

The second lens unit L2 includes a single lens to realize miniaturization and reduced weight of the entire zoom lens. The composite focal length of the first lens unit L1 and the second lens unit L2 is negative at the telephoto end, and the zoom lens satisfies the condition (1). The second lens unit L2 and the third lens unit L3 effectively have a focal relationship at the telephoto end for reducing the variation in spherical aberration and the variation in axial chromatic aberration during focusing by use of the third lens unit L3. This configuration brings high optical performance.

The refractive power of the third lens unit L3 is set in order that the zoom lens satisfies the condition (1) as well as the condition (2). This configuration easily makes the third lens unit L3 have a simple lens configuration, which contributes to the miniaturization and reduced weight. It is also configured that the appropriate focus sensitivity can be obtained. The aperture stop SP is arranged in the fourth lens unit L4. The aperture stop SP may be arranged on the most object-side of the fourth lens unit L4. However, to avoid the interference with the focusing mechanism of the third lens unit L3, the aperture stop SP can be arranged in the fourth lens unit L4.

The fourth exemplary embodiment is similar to the third exemplary embodiment in the arrangement of the refractive power of each lens unit, the zooming method, and the focusing method. The lens configuration of each lens unit in the fourth exemplary embodiment is also similar to that in the third exemplary embodiment. The zoom lens in the fourth exemplary embodiment is a five-unit zoom lens with a zoom ratio of 2.70 and F-number of 3.60 to 5.80.

The fifth exemplary embodiment is similar to the first exemplary embodiment in the arrangement of the refractive power of each lens unit, the zooming method, and the focusing method. The lens configuration of each lens unit in the fifth exemplary embodiment is also similar to that in the first exemplary embodiment. The zoom lens in the fifth exemplary embodiment is a four-unit zoom lens with a zoom ratio of 2.70 and F-number of 3.60 to 5.80.

The zoom lens in the sixth exemplary embodiment includes the first lens unit L1 having negative refractive power, the second lens unit L2 having positive refractive power, the third lens unit L3 having negative refractive power, and the fourth lens unit L4 having positive refractive power and including the aperture stop SP, in order from the object side to the image side. The zoom lens in the sixth exemplary embodiment is a four-unit zoom lens with a zoom ratio of 2.7 and F-number of 3.60 to 5.80. In the sixth exemplary embodiment, the second lens unit L2, the third lens unit L3, and the fourth lens unit L4 move with the same locus during zooming to simplify the mechanical structure.

Therefore, the zoom lens in the sixth exemplary embodiment can be regarded as a two-unit zoom lens. In addition, the second lens unit L2, the third lens unit L3, and the fourth lens unit L4 may move with different loci. The focusing method is similar to that in the first exemplary embodiment. The third lens unit L3 includes a single lens to realize miniaturization and reduced weight, and to facilitate high-speed focusing.

The second lens unit L2 includes a single lens to realize miniaturization and reduced weight of the entire zoom lens. The composite focal length of the first lens unit L1 and the second lens unit L2 is negative at the telephoto end, and the zoom lens satisfies the condition (1). The second lens unit L2 and the third lens unit L3 effectively have a focal relationship at the telephoto end for reducing the variation in spherical aberration and the variation in axial chromatic aberration during focusing by use of the third lens unit L3. This configuration brings high optical performance.

The refractive power of the third lens unit L3 is set in order that the zoom lens satisfies the condition (1) as well as the condition (2). This configuration easily makes the third lens unit L3 have a simple lens configuration, which contributes to the miniaturization and reduced weight. It is also configured that the appropriate focus sensitivity can be obtained. The aperture stop SP is arranged in the fourth lens unit L4. The aperture stop SP may be arranged on the most object-side of the fourth lens unit L4. However, to avoid the interference with the focusing mechanism of the third lens unit L3, the aperture stop SP can be arranged in the fourth lens unit L4.

The zoom lens according to each of the exemplary embodiments of the present invention has been described above. The present invention is not limited to these exemplary embodiments, and various modifications and changes are possible without departing from the scope of the exemplary embodiments.

Specific numerical data of numerical examples 1 to 6 corresponding respectively to the first to sixth exemplary embodiments will be described below. In each of the numerical examples 1 to 6, i represents the number of the surface counted from the object side. ri is a radius of curvature of the i-th optical surface (the i-th surface). di is an axial distance between the i-th surface and the (i+1)th surface. ndi and vdi are a refractive index and Abbe number of the material of the i-th optical member at the d-line. Fno is an F-number, and ω is a half angle of view. BF is a back focus.

The aspheric shape is expressed by an equation of $x=(h^2/r)/[1+\{1-(1+k)\times(h/r)2\}^{1/2}]+A4\times h^4+A6\times h^6+A8\times h^8+A10\times h^{10}$, when the advancing direction of light is defined as positive, x is defined as a displacement amount from the surface vertex in the optical axis direction, h is defined as the height from the optical axis in the direction perpendicular to the optical axis, r is defined as the paraxial radius of curvature, K is defined as a conic constant, and A4, A6, A8, and A10 are defined as aspheric coefficients.

"E±XX" in each aspheric coefficient means "$\times 10^{\pm XX}$". Table 1 shows the relationship between each condition described above and each numerical example.

NUMERICAL EXAMPLE 1

| Unit: mm | | | | |
|---|---|---|---|---|
| Surface data | | | | |
| Surface number | r | d | nd | vd |
| 1 | 174.849 | 3.30 | 1.51633 | 64.1 |
| 2 | −596.700 | 0.50 | | |
| 3 | 37.034 | 1.50 | 1.77250 | 49.6 |
| 4 | 16.733 | 7.18 | | |
| 5 | 187.930 | 1.20 | 1.77250 | 49.6 |
| 6 | 24.150 | 4.68 | | |
| 7 | 24.542 | 3.20 | 1.78472 | 25.7 |
| 8 | 47.138 | (variable) | | |
| 9 | 71.775 | 2.00 | 1.48749 | 70.2 |
| 10 | −154.298 | (variable) | | |
| 11 | −32.928 | 0.90 | 1.77250 | 49.6 |
| 12 | −218.827 | (variable) | | |
| 13 | 25.357 | 2.80 | 1.60311 | 60.6 |
| 14 | −61.937 | 1.04 | | |
| 15 (stop) | ∞ | 1.00 | | |
| 16 | 17.813 | 2.50 | 1.62299 | 58.2 |
| 17 | 51.600 | 3.12 | | |
| 18 | −84.742 | 0.70 | 1.73800 | 32.3 |
| 19 | 18.328 | 2.46 | | |
| 20* | 44.289 | 2.50 | 1.58313 | 59.4 |
| 21 | −34.470 | (variable) | | |
| Image plane | ∞ | | | |

| Aspheric surface data | | |
|---|---|---|
| Twentieth surface | | |
| K = 0.00000e+000 | A4 = −3.62710e−005 | A6 = 1.40293e−008 |
| A8 = −3.64554e−009 | A10 = 4.37020e−011 | |

| Various data | | |
|---|---|---|
| Zoom ratio 2.70 | | |
| | Wide-angle end | Middle | Telephoto end |
|---|---|---|---|
| Focal length | 18.50 | 31.23 | 50.00 |
| F-number | 3.60 | 4.44 | 5.80 |
| Half angle of view (degree) | 36.44 | 23.63 | 15.28 |
| Image height | 13.66 | 13.66 | 13.66 |
| Total lens length | 117.83 | 108.56 | 116.16 |
| BF | 37.79 | 50.64 | 69.91 |
| d8 | 35.06 | 12.95 | 1.27 |
| d10 | 2.66 | 3.00 | 3.52 |
| d12 | 1.74 | 1.39 | 0.88 |
| d21 | 37.79 | 50.64 | 69.91 |

| Data of zoom lens unit | | |
|---|---|---|
| Unit | Start surface | Focal length |
| 1 | 1 | −32.22 |
| 2 | 9 | 100.78 |
| 3 | 11 | −50.28 |
| 4 | 13 | 24.71 |

NUMERICAL EXAMPLE 2

Unit: mm

Surface data

| Surface number | R | d | nd | vd |
|---|---|---|---|---|
| 1 | 234.122 | 3.30 | 1.51633 | 64.1 |
| 2 | −369.717 | 0.50 | | |
| 3 | 38.841 | 1.50 | 1.71300 | 53.9 |
| 4 | 18.094 | 7.04 | | |
| 5 | 174.872 | 1.20 | 1.77250 | 49.6 |
| 6 | 21.288 | 4.85 | | |
| 7 | 24.017 | 3.20 | 1.76182 | 26.5 |
| 8 | 47.796 | (variable) | | |
| 9 | 56.124 | 2.00 | 1.51633 | 64.1 |
| 10 | −696.875 | (variable) | | |
| 11 | −33.197 | 0.90 | 1.77250 | 49.6 |
| 12 | −249.811 | (variable) | | |
| 13 | 25.574 | 2.80 | 1.60311 | 60.6 |
| 14 | −58.349 | 1.04 | | |
| 15 (stop) | ∞ | 0.99 | | |
| 16 | 17.607 | 2.50 | 1.60311 | 60.6 |
| 17 | 55.288 | 2.76 | | |
| 18 | −100.236 | 0.70 | 1.73800 | 32.3 |
| 19 | 18.766 | 3.06 | | |
| 20* | 47.624 | 2.50 | 1.58313 | 59.4 |
| 21 | −38.690 | (variable) | | |
| Image plane | ∞ | | | |

Aspheric surface data
Twentieth surface $K = 0.00000e+000$  $A4 = -3.67398e-005$  $A6 = -1.79951e-008$
$A8 = -2.58363e-009$  $A10 = 2.55887e-011$

Various data
Zoom ratio 2.92

| | Wide-angle end | Middle | Telephoto end |
|---|---|---|---|
| Focal length | 18.50 | 32.89 | 54.00 |
| F-number | 3.49 | 4.39 | 5.80 |
| Half angle of view (degree) | 36.44 | 22.55 | 14.20 |
| Image height | 13.66 | 13.66 | 13.66 |
| Total lens length | 119.77 | 110.06 | 120.23 |
| BF | 37.98 | 52.51 | 74.3 |
| d8 | 36.82 | 12.58 | 0.95 |
| d10 | 2.49 | 2.93 | 3.60 |
| d12 | 1.65 | 1.21 | 0.54 |
| d21 | 37.98 | 52.51 | 74.30 |

Data of zoom lens unit

| Unit | Start surface | Focal length |
|---|---|---|
| 1 | 1 | −32.70 |
| 2 | 9 | 100.69 |
| 3 | 11 | −49.65 |
| 4 | 13 | 24.83 |

NUMERICAL EXAMPLE 3

Unit: mm

Surface data

| Surface number | r | d | nd | vd |
|---|---|---|---|---|
| 1 | 214.299 | 3.30 | 1.48749 | 70.2 |
| 2 | −415.242 | 0.50 | | |
| 3 | 41.824 | 1.50 | 1.71300 | 53.9 |
| 4 | 17.578 | 7.60 | | |
| 5 | 157.833 | 1.20 | 1.80400 | 46.6 |
| 6 | 22.506 | 3.84 | | |
| 7 | 23.600 | 3.20 | 1.78472 | 25.7 |
| 8 | 46.417 | (variable) | | |
| 9 | 56.673 | 2.00 | 1.51633 | 64.1 |
| 10 | −89.111 | (variable) | | |
| 11 | −31.019 | 0.90 | 1.77250 | 49.6 |
| 12 | 268.018 | (variable) | | |
| 13 | 24.791 | 3.00 | 1.62299 | 58.2 |
| 14 | −51.064 | 1.04 | | |
| 15 (stop) | ∞ | 0.99 | | |
| 16 | 16.606 | 2.50 | 1.60311 | 60.6 |
| 17 | 42.631 | 2.78 | | |
| 18 | −85.541 | 0.70 | 1.73800 | 32.3 |
| 19 | 19.089 | (variable) | | |
| 20* | 45.001 | 2.50 | 1.58313 | 59.4 |
| 21 | −35.174 | (variable) | | |
| Image plane | ∞ | | | |

Aspheric surface data
Twentieth surface $K = 0.00000e+000$  $A4 = -4.33005e-005$  $A6 = -4.58352e-008$
$A8 = -2.40941e-009$  $A10 = 2.24830e-011$

Various data
Zoom ratio 3.09

| | Wide-angle end | Middle | Telephoto end |
|---|---|---|---|
| Focal length | 17.50 | 32.05 | 54.00 |
| F-number | 3.47 | 4.38 | 5.80 |
| Half angle of view (degree) | 37.97 | 23.08 | 14.20 |
| Image height | 13.66 | 13.66 | 13.66 |
| Total lens length | 119.55 | 108.81 | 118.68 |
| BF | 36.59 | 51.53 | 73.93 |
| d8 | 38.74 | 13.30 | 1.10 |
| d10 | 2.82 | 2.85 | 2.89 |
| d12 | 0.82 | 0.79 | 0.75 |
| d19 | 3.03 | 2.80 | 2.45 |
| d21 | 36.59 | 51.53 | 73.93 |

Data of zoom lens unit

| Unit | Start surface | Focal length |
|---|---|---|
| 1 | 1 | −30.98 |
| 2 | 9 | 67.41 |
| 3 | 11 | −35.94 |
| 4 | 13 | 33.69 |
| 5 | 20 | 34.25 |

NUMERICAL EXAMPLE 4

Unit: mm

Surface data

| Surface number | r | d | nd | vd |
|---|---|---|---|---|
| 1 | 250.873 | 3.30 | 1.48749 | 70.2 |
| 2 | −262.904 | 0.50 | | |
| 3 | 40.809 | 1.50 | 1.71300 | 53.9 |
| 4 | 19.223 | 7.02 | | |
| 5 | 224.619 | 1.20 | 1.80400 | 46.6 |
| 6 | 19.278 | 5.31 | | |
| 7 | 24.298 | 3.20 | 1.78472 | 25.7 |
| 8 | 54.590 | (variable) | | |
| 9 | 49.652 | 2.00 | 1.51633 | 64.1 |

-continued

| Unit: mm | | | | |
|---|---|---|---|---|
| 10 | −97.997 | (variable) | | |
| 11 | −32.800 | 0.90 | 1.77250 | 49.6 |
| 12 | −94.332 | (variable) | | |
| 13 | 29.029 | 3.00 | 1.62299 | 58.2 |
| 14 | −38.318 | 1.04 | | |
| 15 (stop) | ∞ | 0.97 | | |
| 16 | 18.093 | 2.50 | 1.60311 | 60.6 |
| 17 | 62.170 | 0.77 | | |
| 18 | −43.475 | 2.49 | 1.73800 | 32.3 |
| 19 | 16.336 | (variable) | | |
| 20 | 97.685 | 2.50 | 1.51742 | 52.4 |
| 21 | −23.503 | (variable) | | |
| Image plane | ∞ | | | |

Various data
Zoom ratio 2.70

| | Wide-angle end | Middle | Telephoto end |
|---|---|---|---|
| Focal length | 18.50 | 30.98 | 50.00 |
| F-number | 3.60 | 4.40 | 5.80 |
| Half angle of view (degree) | 36.44 | 23.79 | 15.28 |
| Image height | 13.66 | 13.66 | 13.66 |
| Total lens length | 119.78 | 110.32 | 117.3 |
| BF | 35.4 | 48.41 | 67.93 |
| d8 | 34.53 | 12.66 | 1.02 |
| d10 | 5.12 | 5.49 | 6.05 |
| d12 | 2.05 | 1.67 | 1.11 |
| d19 | 4.47 | 3.87 | 2.98 |
| d21 | 35.40 | 48.41 | 67.93 |

Data of zoom lens unit

| Unit | Start surface | Focal length |
|---|---|---|
| 1 | 1 | −31.29 |
| 2 | 9 | 64.12 |
| 3 | 11 | −65.51 |
| 4 | 13 | 61.44 |
| 5 | 20 | 36.87 |

NUMERICAL EXAMPLE 5

| Unit: mm | | | | |
|---|---|---|---|---|
| Surface data | | | | |
| Surface number | r | d | nd | vd |
| 1 | 310.436 | 3.30 | 1.48749 | 70.2 |
| 2 | −230.483 | 0.50 | | |
| 3 | 45.088 | 1.50 | 1.71300 | 53.9 |
| 4 | 20.159 | 6.05 | | |
| 5 | 97.112 | 1.20 | 1.80400 | 46.6 |
| 6 | 18.611 | 5.05 | | |
| 7 | 22.392 | 3.20 | 1.78472 | 25.7 |
| 8 | 41.867 | (variable) | | |
| 9 | 43.537 | 2.00 | 1.51633 | 64.1 |
| 10 | −142.905 | (variable) | | |
| 11 | −33.034 | 0.90 | 1.77250 | 49.6 |
| 12 | −107.007 | (variable) | | |
| 13 | 30.085 | 3.00 | 1.67790 | 55.3 |
| 14 | −48.521 | 1.04 | | |
| 15 (stop) | ∞ | 0.96 | | |
| 16 | 20.035 | 2.50 | 1.60311 | 60.6 |
| 17 | 125.173 | 0.96 | | |

-continued

| Unit: mm | | | | |
|---|---|---|---|---|
| 18 | −44.652 | 2.27 | 1.73800 | 32.3 |
| 19 | 16.582 | 3.66 | | |
| 20 | 79.003 | 2.50 | 1.51742 | 52.4 |
| 21 | −24.691 | (variable) | | |
| Image plane | ∞ | | | |

Various data
Zoom ratio 2.70

| | Wide-angle end | Middle | Telephoto end |
|---|---|---|---|
| Focal length | 18.50 | 31.11 | 50.00 |
| F-number | 3.60 | 4.47 | 5.80 |
| Half angle of view (degree) | 36.44 | 23.70 | 15.28 |
| Image height | 13.66 | 13.66 | 13.66 |
| Total lens length | 119.75 | 109.61 | 116.12 |
| BF | 35.58 | 48.35 | 67.51 |
| d8 | 36.33 | 13.42 | 0.78 |
| d10 | 4.68 | 4.76 | 4.87 |
| d12 | 2.57 | 2.50 | 2.38 |
| d21 | 35.58 | 48.35 | 67.51 |

Data of zoom lens unit

| Unit | Start surface | Focal length |
|---|---|---|
| 1 | 1 | −32.20 |
| 2 | 9 | 64.87 |
| 3 | 11 | −62.19 |
| 4 | 13 | 30.41 |

NUMERICAL EXAMPLE 6

| Unit: mm | | | | |
|---|---|---|---|---|
| Surface data | | | | |
| Surface number | r | d | nd | vd |
| 1 | 40.673 | 1.50 | 1.77250 | 49.6 |
| 2* | 18.946 | 5.07 | | |
| 3 | 55.594 | 1.20 | 1.80400 | 46.6 |
| 4 | 19.022 | 5.60 | | |
| 5 | 23.964 | 3.20 | 1.78472 | 25.7 |
| 6 | 47.434 | (variable) | | |
| 7 | 40.959 | 2.00 | 1.51633 | 64.1 |
| 8 | −201.861 | 4.45 | | |
| 9 | −28.676 | 0.90 | 1.77250 | 49.6 |
| 10 | −85.337 | 1.54 | | |
| 11 | 32.423 | 3.00 | 1.67790 | 55.3 |
| 12 | −46.634 | 1.04 | | |
| 13 (stop) | ∞ | 0.98 | | |
| 14 | 21.471 | 2.50 | 1.60311 | 60.6 |
| 15 | 977.344 | 0.91 | | |
| 16 | −44.615 | 3.66 | 1.73800 | 32.3 |
| 17 | 16.430 | 2.56 | | |
| 18 | 70.329 | 2.50 | 1.51742 | 52.4 |
| 19 | −24.874 | (variable) | | |
| Image plane | ∞ | | | |

Aspheric surface data
Second surface

K = 0.00000e+000    A4 = −5.13651e−006    A6 = −4.27025e−008
A8 = 1.32976e−010    A10 = −6.45914e−013

-continued

Unit: mm

Various data
Zoom ratio 2.70

|  | Wide-angle end | Middle | Telephoto end |
|---|---|---|---|
| Focal length | 18.50 | 31.10 | 50.00 |
| F-number | 3.60 | 4.46 | 5.80 |
| Half angle of view (degree) | 36.44 | 23.71 | 15.28 |
| Image height | 13.66 | 13.66 | 13.66 |
| Total lens length | 116.62 | 104.3 | 108.95 |
| BF | 35.41 | 47.57 | 65.82 |
| d6 | 38.60 | 14.11 | 0.52 |
| d8 | 4.45 | 4.45 | 4.45 |
| d10 | 1.54 | 1.54 | 1.54 |
| d19 | 35.41 | 47.57 | 65.82 |

Data of zoom lens unit

| Unit | start surface | focal length |
|---|---|---|
| 1 | 1 | −34.04 |
| 2 | 7 | 66.13 |
| 3 | 9 | −56.30 |
| 4 | 11 | 29.19 |

TABLE 1

| Conditions | Numerical examples | | | | | |
|---|---|---|---|---|---|---|
|  | 1 | 2 | 3 | 4 | 5 | 6 |
| (1) ft/f12t | −0.84 | −0.90 | −0.62 | −0.46 | −0.49 | −0.40 |
| (2) √(fw · ft)/f3 | −0.60 | −0.64 | −0.86 | −0.46 | −0.49 | −0.54 |
| (3) f1/f2 | −0.32 | −0.32 | −0.46 | −0.49 | −0.50 | −0.51 |
| (4) (β3w)$^2$ | 0.013 | 0.011 | 0.010 | 0.060 | 0.052 | 0.065 |
| (5) (β3t)$^2$ | 0.128 | 0.129 | 0.049 | 0.081 | 0.088 | 0.055 |
| (6) (r3b − r3a)/(r3a + r3b) | 0.74 | 0.77 | 1.26 | 0.48 | 0.53 | 0.50 |
| (7) D3w/D2w | 0.65 | 0.66 | 0.29 | 0.40 | 0.55 | 0.35 |
| (8) D3t/D2t | 0.25 | 0.15 | 0.26 | 0.18 | 0.49 | 0.35 |
| (9) (β4t · fw)/(β4w · ft) | 0.83 | 0.82 | 0.79 | 1.06 | 1.02 | 0.96 |
| (10) fw/f2 | 0.18 | 0.18 | 0.26 | 0.29 | 0.29 | 0.28 |
| (11) |fw/f3| | 0.37 | 0.37 | 0.49 | 0.28 | 0.30 | 0.33 |

FIG. 13 illustrates a camera body 20, and a photographic optical system 21 including any one of zoom lenses according to the first to sixth exemplary embodiments. A solid-state image sensor (photoelectric conversion element) 22 such as a CCD sensor or a CMOS sensor, which receives an object image formed by the photographic optical system 21 is incorporated in the camera body 20. The zoom lens according to each of the exemplary embodiments is applicable to a single-lens reflex camera having a quick return mirror, or a mirrorless single-lens reflex camera having no quick return mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-159442 filed Jul. 18, 2012, which is hereby incorporated by reference herein in its entirety.

What is claimed is:

1. A zoom lens comprising, in order from an object side to an image side:

a first lens unit having negative refractive power;
a second lens unit having positive refractive power;
a third lens unit having negative refractive power; and
a fourth lens unit having positive refractive power,
wherein each lens unit moves during zooming,
wherein the third lens unit moves toward the object side during focusing from an infinitely-distant object to a nearby object, and
wherein, when a focal length of the third lens unit is f3, a composite focal length of the first lens unit and the second lens unit at a telephoto end is f12t, a focal length of the entire zoom lens at a wide-angle end is fw, and a focal length of the entire zoom lens at the telephoto end is ft, the mathematical conditions below are satisfied:

$$-1.50 < ft/f12t < -0.05$$

$$-1.20 < \sqrt{(fw \cdot ft)}/f3 < -0.20.$$

2. The zoom lens according to claim 1, wherein, when a focal length of the first lens unit is f1, and a focal length of the second lens unit is f2, a condition below is satisfied:

$$-1.00 < f1/f2 < -0.10.$$

3. The zoom lens according to claim 1, wherein, when a paraxial lateral magnification of the third lens unit at the wide-angle end is β3w, and a paraxial lateral magnification of the third lens unit at the telephoto end is β3t, conditions below are satisfied:

$$0.005 < (\beta 3w)^2 < 0.200$$

$$0.010 < (\beta 3t)^2 < 0.200.$$

4. The zoom lens according to claim 1, wherein, when a radius of curvature of the most object side lens surface of the third lens unit is r3a, and a radius of curvature of the most image side lens surface of the third lens unit is r3b, a condition below is satisfied:

$$0.20 < (r3b - r3a)/(r3a + r3b) < 2.00.$$

5. The zoom lens according to claim 1, wherein, when an air distance between the second lens unit and the third lens unit at the wide-angle end is D2w, an air distance between the third lens unit and the fourth lens unit at the wide-angle end is D3w, an air distance between the second lens unit and the third lens unit at the telephoto end is D2t, and an air distance between the third lens unit and the fourth lens unit at the telephoto end is D3t, conditions below are satisfied:

$$0.05<D3w/D2w<0.80$$

$$0.05<D3t/D2t<0.80.$$

6. The zoom lens according to claim 1, wherein, when a paraxial lateral magnification of the fourth lens unit at the wide-angle end is β4w, and a paraxial lateral magnification of the fourth lens unit at the telephoto end is β4t, a condition below is satisfied:

$$0.60<(β4t·fw)/(β4w·ft)<1.40.$$

7. The zoom lens according to claim 1, wherein the fourth lens unit includes an aperture stop.

8. The zoom lens according to claim 1, wherein the second lens unit includes a single positive lens, and
wherein, when a focal length of the second lens unit is f2, a condition below is satisfied:

$$0.10<fw/f2<0.40.$$

9. The zoom lens according to claim 1, wherein the third lens unit includes a single negative lens, and
wherein a condition below is satisfied:

$$0.20<|fw/f3|<0.60.$$

10. The zoom lens according to claim 1, wherein, during zooming from the wide-angle end to the telephoto end, the first lens unit moves with a locus convex toward the image side, and the second lens unit, the third lens unit, and the fourth lens unit move toward the object side.

11. The zoom lens according to claim 1, wherein the fourth lens unit includes a first lens subunit L4A having positive refractive power and a second lens subunit L4B having positive refractive power, and wherein the first lens subunit L4A and the second lens subunit L4B move along different loci during zooming.

12. The zoom lens according to claim 1, wherein the second lens unit, the third lens unit, and the fourth lens unit move with the same locus during zooming.

13. An image pickup apparatus comprising:
a zoom lens; and
an image sensor configured to receive an image formed by the zoom lens,
wherein the zoom lens includes, in order from an object side to an image side, a first lens unit having negative refractive power, a second lens unit having positive refractive power, a third lens unit having negative refractive power, and a fourth lens unit having positive refractive power,
wherein each lens unit moves during zooming,
wherein the third lens unit moves toward the object side during focusing from an infinitely-distant object to a nearby object, and
wherein, when a focal length of the third lens unit is f3, a composite focal length of the first lens unit and the second lens unit at a telephoto end is f12t, a focal length of the entire zoom lens at a wide-angle end is fw, and a focal length of the entire zoom lens at the telephoto end is ft, conditions below are satisfied:

$$-1.50<ft/f12t<-0.05$$

$$-1.20<\sqrt{(fw·ft)}/f3<-0.20.$$

14. The image pickup apparatus according to claim 13, further comprising:
a defocus direction detection unit configured to detect a defocus direction by vibrating the third lens unit in an optical axis direction; and
a calculation unit configured to calculate a position of the third lens unit where an in-focus state is available, based on image information acquired by the image sensor.

* * * * *